United States Patent
Ono

(10) Patent No.: US 11,377,816 B2
(45) Date of Patent: Jul. 5, 2022

(54) SHOVEL

(71) Applicant: SUMITOMO HEAVY INDUSTRIES, LTD., Tokyo (JP)

(72) Inventor: Tetsuji Ono, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 180 days.

(21) Appl. No.: 16/809,839

(22) Filed: Mar. 5, 2020

(65) Prior Publication Data
US 2020/0199843 A1   Jun. 25, 2020

Related U.S. Application Data

(63) Continuation of application No. PCT/JP2018/031506, filed on Aug. 27, 2018.

(30) Foreign Application Priority Data

Sep. 8, 2017 (JP) .............................. JP2017-172830

(51) Int. Cl.
| | |
|---|---|
| E02F 3/43 | (2006.01) |
| E02F 3/32 | (2006.01) |
| E02F 9/12 | (2006.01) |
| E02F 9/20 | (2006.01) |
| E02F 9/26 | (2006.01) |
| G09B 19/16 | (2006.01) |

(52) U.S. Cl.
CPC ................ *E02F 3/439* (2013.01); *E02F 3/32* (2013.01); *E02F 9/123* (2013.01); *E02F 9/2037* (2013.01);
(Continued)

(58) Field of Classification Search
CPC ... E02F 3/439; E02F 3/32; E02F 9/123; E02F 9/2037; E02F 9/2041; E02F 9/265;
(Continued)

(56) References Cited

U.S. PATENT DOCUMENTS

| 4,889,466 A | 12/1989 | Jindai et al. |
| 2003/0019132 A1 | 1/2003 | Kurenuma et al. |

(Continued)

FOREIGN PATENT DOCUMENTS

| JP | S56-051854 U | 5/1981 |
| JP | S62-038493 | 8/1987 |

(Continued)

OTHER PUBLICATIONS

International Search Report for PCT/JP2018/031506 dated Nov. 13, 2018.

*Primary Examiner* — Russell Frejd
(74) *Attorney, Agent, or Firm* — IPUSA, PLLC

(57) ABSTRACT

A shovel includes a traveling body, a turning body mounted on the traveling body, a work attachment including a boom attached to the turning body, an arm attached to an end of the boom, and an end attachment attached to an end of the arm, and a processor coupled to a memory storing instructions and configured to read and execute the instructions stored in the memory to control a turning operation of the turning body in accordance with a predetermined operation of the work attachment to cause the end attachment to perform the predetermined operation as seen in a plan view in response to an operation by an operator.

17 Claims, 14 Drawing Sheets

(52) U.S. Cl.
CPC ............ *E02F 9/2041* (2013.01); *E02F 9/265* (2013.01); *G09B 19/167* (2013.01)

(58) Field of Classification Search
CPC ......... E02F 3/437; E02F 3/435; E02F 9/2004; G09B 19/167
See application file for complete search history.

(56) References Cited

U.S. PATENT DOCUMENTS

| | | |
|---|---|---|
| 2006/0246020 A1 | 11/2006 | Cole et al. |
| 2015/0284930 A1* | 10/2015 | Tsukamoto ............ E02F 9/2292 701/50 |
| 2018/0305902 A1 | 10/2018 | Tsukamoto |

FOREIGN PATENT DOCUMENTS

| | | |
|---|---|---|
| JP | H02-101229 | 4/1990 |
| JP | H05-33363 | 2/1993 |
| JP | H06-063249 | 8/1994 |
| JP | H07-094735 | 10/1995 |
| JP | H07-317097 | 12/1995 |
| JP | H08-311918 | 11/1996 |
| JP | H11-050495 | 2/1999 |
| JP | H11-264155 | 9/1999 |
| JP | H11-324027 | 11/1999 |
| JP | 2003-105795 | 4/2003 |
| JP | 2012-103262 | 5/2012 |
| WO | 98/03738 | 1/1998 |
| WO | 2017/115809 | 7/2017 |

\* cited by examiner

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2018/031506, filed on Aug. 27, 2018 and designating the U.S., which claims priority to Japanese patent application No. 2017-172830, filed on Sep. 8, 2017. The entire contents of the foregoing applications are incorporated herein by reference.

BACKGROUND

Technical Field

The present invention relates to a shovel.

Description of Related Art

For example, construction such as excavation and leveling is performed using a shovel.

SUMMARY

According to an aspect of the present invention, a shovel includes a traveling body, a turning body mounted on the traveling body, a work attachment including a boom attached to the turning body, an arm attached to an end of the boom, and an end attachment attached to an end of the arm, and a processor coupled to a memory storing instructions and configured to read and execute the instructions stored in the memory to control a turning operation of the turning body in accordance with a predetermined operation of the work attachment to cause the end attachment to perform the predetermined operation as seen in a plan view in response to an operation by an operator.

DETAILED DESCRIPTION

When construction such as excavation and leveling is performed with an end attachment such as a bucket, it is necessary to align an extension direction of an attachment including a boom, an arm, and the like with a construction direction (an excavation direction and a leveling direction). In other words, depending on a location where construction is performed, it is necessary to position a shovel with a traveling body, or it is necessary to make correction with an operation of a turning body. Therefore, there is room for improvement from the viewpoint of work efficiency in construction.

In view of the above problems, it is an object of the present invention to provide a shovel that can further improve work efficiency during construction with an attachment.

Hereinafter, an embodiment of the invention will be described with reference to the drawings.

[Overview of Shovel]

First, a configuration of a shovel 500 according to this embodiment will be described with reference to FIG. 1.

Figure 1:
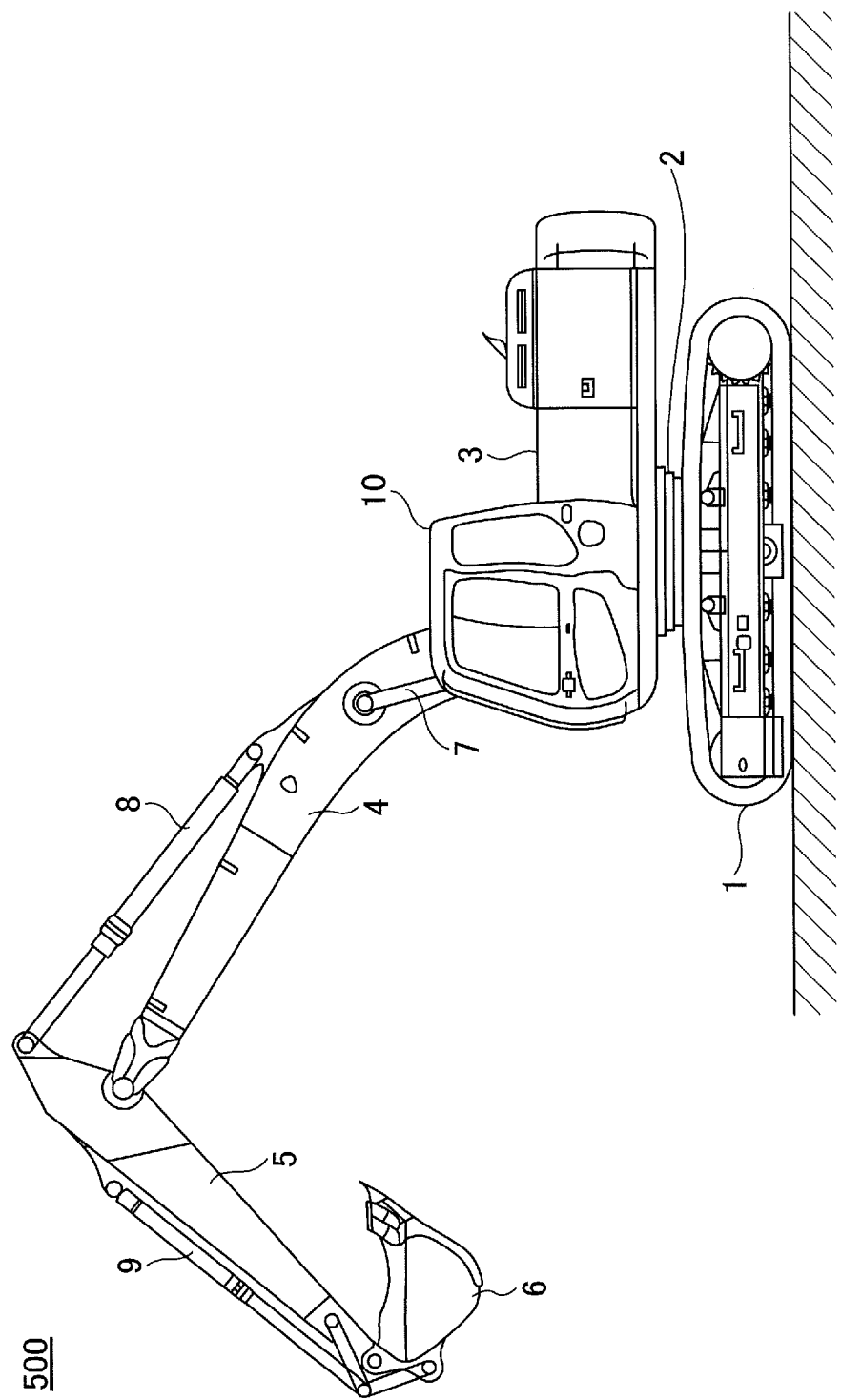
FIG. 1 is a side view of a shovel.

FIG. 1 is a side view of the shovel 500 according to this embodiment.

The shovel 500 according to this embodiment includes a lower traveling body 1, an upper turning body 3 turnably mounted on the lower traveling body 1 via a turning mechanism 2, a boom 4, an arm 5, a bucket 6, and a cabin 10 in which an operator rides. The boom 4, the arm 5, and the bucket 6 serve as an attachment (an example of a work attachment).

The lower traveling body 1 (an example of a traveling body) includes, for example, a pair of left and right crawlers, which are hydraulically driven by traveling hydraulic motors 1A and 1B (see FIG. 2), respectively, to cause the shovel 500 to travel.

The upper turning body 3 (an example of a turning body) is driven by a turning electric motor 21 (see FIG. 2), which will be described below to turn relative to the lower traveling body 1.

The boom 4 is pivotally attached to the front center of the upper turning body 3 to be able to vertically pivot, the arm 5 is pivotally attached to the end of the boom 4 to be able to pivot vertically, and the bucket 6 (an example of an end attachment) is pivotally attached to the end of the arm 5. The boom 4, the arm 5, and the bucket 6 are hydraulically driven by a boom cylinder 7, an arm cylinder 8, and a bucket cylinder 9, respectively, which serve as hydraulic actuators.

The cabin 10, which is an operator room in which an operator rides, is mounted on the front left of the upper turning body 3.

[Basic Configuration of Shovel]

Next, a basic configuration of the shovel 500 will be described with reference to FIG. 2.

Figure 2:
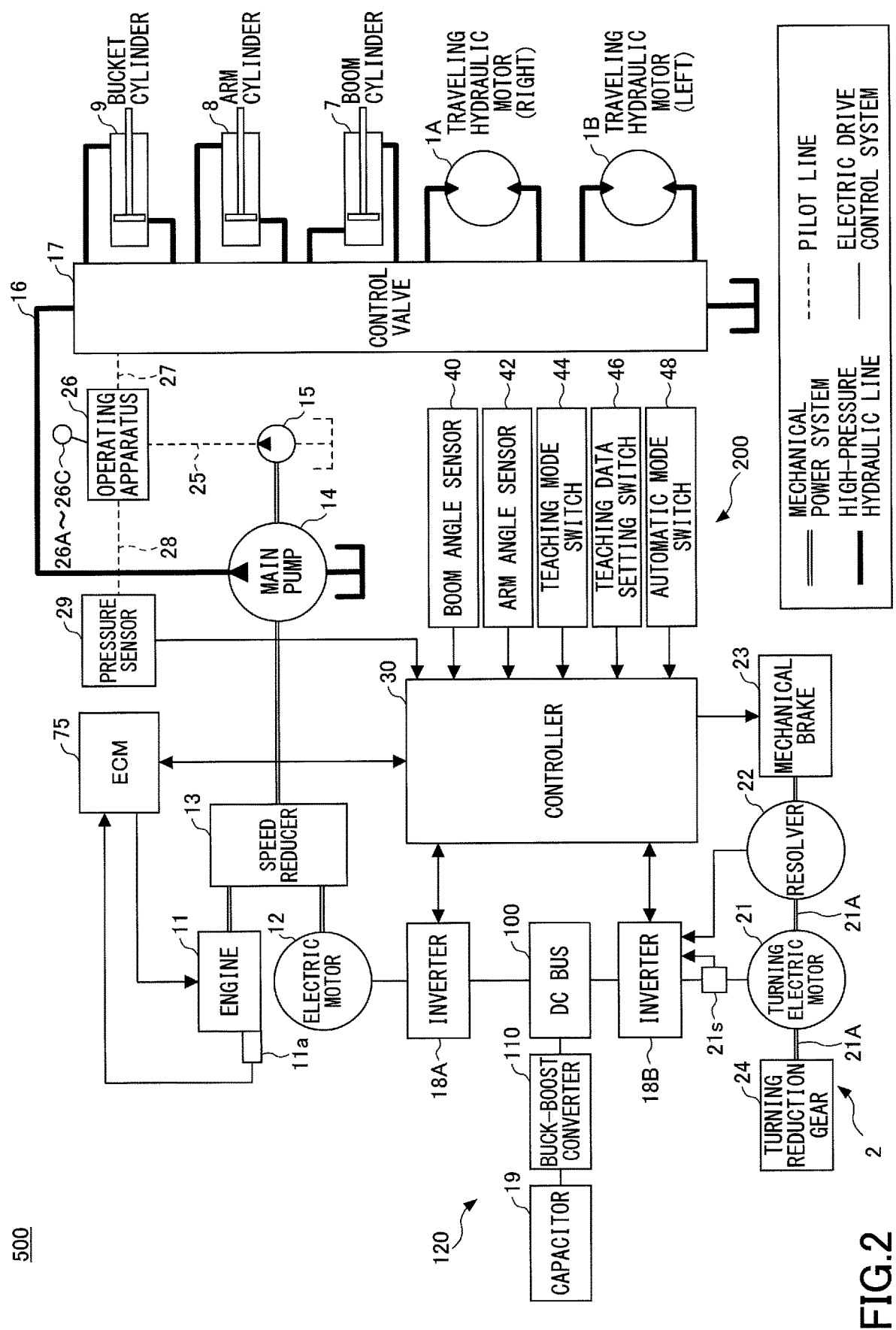
FIG. 2 is a block diagram illustrating an example of a configuration of the shovel.

FIG. 2 is a block diagram illustrating an example of a configuration of the shovel 500 according to this embodiment.

In drawing, a mechanical power line, a high-pressure hydraulic line, a pilot line, and an electric drive and control system are indicated by a double line, a thick solid line, a dashed line, and a thin solid line, respectively.

A hydraulic drive system that hydraulically drives hydraulic actuators of the shovel 500 according to this embodiment includes an engine 11, an electric motor 12, a speed reducer 13, a main pump 14, and a control valve 17. As described above, the hydraulic drive system of the shovel 500 according to this embodiment includes hydraulic actuators such as the traveling hydraulic motors 1A and 1B, the boom cylinder 7, the atm cylinder 8, and the bucket cylinder 9, which hydraulically drive the lower traveling body 1, the boom 4, the arm 5, and the bucket 6, respectively.

The engine 11 is a main power source in the hydraulic drive system, and is mounted on the rear part of the upper turning body 3, for example. Specifically, under the control of an engine control module (ECM: Engine Control Module) 75, which will be described later, the engine 11 rotates constantly at a preset target rotational speed, and drives the main pump 14 and a pilot pump 15 via the speed reducer 13. In addition, the engine 11 drives the electric motor 12 via the speed reducer 13 so that the electric motor 12 can generate electric power. The engine 11 is, for example, a diesel engine using light oil as fuel.

The electric motor 12 is an assist power source in the hydraulic drive system that assists the engine 11 in driving the main pump 14. For example, the electric motor 12 is mounted, together with the engine 11 and the speed reducer 13, as a unit, on the rear part of the upper turning body 3. The electric motor 12 is connected to an electric power storage system 120 including a capacitor 19 via an inverter 18A. The electric motor 12 performs power running operation with electric power supplied from the capacitor 19 or the turning electric motor 21 via the inverter 18A to drive the main pump 14 and the pilot pump 15 via the speed reducer 13. In addition, the electric motor 12 can be driven by the engine 11 to perform a generator operation to supply the generated power to the capacitor 19 and the turning electric motor 21. The switching between the power running operation and the generator operation of the electric motor 12 can be controlled by controlling the drive of the inverter 18A with a controller 30 described later.

The speed reducer 13 is mounted on the rear part of the upper turning body 3, for example, like the engine 11, and includes two input shafts to which the engine 11 and the electric motor 12 are connected, and one output shaft to which the main pump 14 and the pilot pump 15 are coaxially connected in series. The speed reducer 13 can transmit the power of the engine 11 and the electric motor 12 to the main pump 14 and the pilot pump 15 at a predetermined reduction ratio. The speed reducer 13 can distribute and transmit the power of the engine 11 to the electric motor 12, the main pump 14, and the pilot pump 15 at a predetermined reduction ratio.

The main pump 14 is mounted, for example, on the rear part of the upper turning body 3, like the engine 11, and supplies hydraulic oil to the control valve 17 through a high-pressure hydraulic line 16. The main pump 14 is driven by the engine 11, or by the engine 11 and the electric motor 12. The main pump 14 is, for example, a variable displacement hydraulic pump, in which a regulator (not illustrated) controls the angle (tilt angle) of a swash plate to adjust the stroke length of a piston under the control of the controller 30 described later, so that the discharge flow rate (discharge pressure) can be controlled.

The control valve 17 is a hydraulic control device that is installed, for example, at the center of the upper turning body 3, and that controls the hydraulic drive system in accordance with an operator's operation of an operating apparatus 26. The control valve 17 is connected to the main pump 14 via the high-pressure hydraulic line 16 as described above, and hydraulic oil supplied from the main pump 14 is selectively supplied to the traveling hydraulic motors 1A (for right), 1B (for left), the boom cylinder 7, the arm cylinder 8, and the bucket cylinder 9 according to the operating state of the operating apparatus 26. Specifically, the control valve 17 is a valve unit including multiple hydraulic control valves (directional control valves) that control the flow rate and the flow direction of hydraulic oil supplied from the main pump 14 to each of the hydraulic actuators.

An electric drive system that drives an electric actuator of the shovel 500 according to this embodiment includes the turning electric motor 21, a mechanical brake 23, and a turning speed reducer 24.

The turning electric motor 21 (an example of an electric motor) is an electric actuator that drives the turning mechanism 2 that turnably connects the upper turning body 3 to the lower traveling body 1, such that the upper turning body 3 can turn relative to the lower traveling body 1. The turning electric motor 21 performs power running operation to turn the upper turning body 3, and performs regenerative operation to generate regenerative power and brake the turning of the upper turning body 3, under the control of the controller 30. The turning electric motor 21 is connected to the electric power storage system 120 via an inverter 18B, and is driven by electric power supplied from the capacitor 19 or the electric motor 12 via the inverter 18B. The turning electric motor 21 supplies regenerative power to the capacitor 19 and the electric motor 12 via the inverter 18B. This allows the capacitor 19 to be charged and the electric motor 12 to be driven with the regenerative power. The switching between the power running operation and the regenerative operation of the turning electric motor 21 can be controlled by controlling the drive of the inverter 18B with the controller 30. A resolver 22, the mechanical brake 23, and the turning speed reducer 24 are connected to a rotating shaft 21A of the turning electric motor 21.

The mechanical brake 23 mechanically generates a braking force for the upper turning body 3 (specifically, the rotating shaft 21A of the turning electric motor 21) under the control of the controller 30 to keep the upper turning body 3 in a stopped state. In addition, for example, when the upper turning body 3 needs to be stopped for an emergency, the mechanical brake 23 may brake the turning of the upper turning body 3.

In FIG. 2, the turning speed reducer 24 and the mechanical brake 23 are described as separate block elements for simplicity, but the mechanical brake 23 may be, for example, a hydraulic disc brake installed between multiple speed reducers included in the turning speed reducer 24, or may be an electromagnetic brake provided separately from the turning speed reducer 24.

The turning speed reducer 24 is connected to the rotating shaft 21A of the turning electric motor 21. By reducing the speed of the output of the turning electric motor 21 at a predetermined reduction ratio, the torque is increased and the upper turning body 3 is turned. That is, during power running operation, the turning electric motor 21 turns the upper turning body 3 via the turning speed reducer 24. In addition, the turning speed reducer 24 increases the inertial rotation force of the upper turning body 3 and transmits the inertial rotation force to the turning electric motor 21 to generate regenerative power. That is, during the regenerative operation, the turning electric motor 21 performs regenerative power generation by the inertial rotation force of the upper turning body 3 transmitted via the turning speed reducer 24 to brake the upper turning body 3.

The electric power storage system 120, which is a power supply for driving the electric motor 12 and the turning electric motor 21 of the shovel 500 according to this embodiment, includes a capacitor 19, a DC bus 100, and a buck-boost converter 110. For example, the electric power storage system 120 is mounted on the right front portion of the upper turning body 3 together with the inverters 18A, 18B.

The capacitor 19 supplies power to the electric motor 12 and the turning electric motor 21, and conversely, the capacitor 19 is charged to store the generated power of the electric motor 12 and the turning electric motor 21 supplied via the DC bus 100 and the buck-boost converter 110.

The DC bus 100 is provided between the inverters 18A, 18B and the buck-boost converter 110, and controls the transfer of electric power between the capacitor 19, the electric motor 12, and the turning electric motor 21.

The buck-boost converter 110 switches between a step-up operation and a step-down operation so that the voltage value of the DC bus 100 falls within a certain range according to the operating state of the electric motor 12 and the turning electric motor 21. Thus, power is transferred between the capacitor 19, the electric motor 12, and the turning electric motor 21. The switching control between the step-up operation and the step-down operation of the buck-boost converter 110 is achieved by the controller 30 based on the detected voltage value of the DC bus 100, the detected voltage value of the capacitor 19, and the detected current value of the capacitor 19.

The operation system of the shovel 500 according to this embodiment includes the pilot pump 15, the operating apparatus 26, and a pressure sensor 29.

The pilot pump 15 is installed, for example, on the rear part of the upper turning body 3, and applies a pilot pressure to the operating apparatus 26 via a pilot line 25. For example, the pilot pump 15 is a fixed displacement hydraulic pump, and is driven by the engine 11 or by the engine 11 and the electric motor 12.

The operating apparatus 26 includes levers 26A and 26B, and a pedal 26C. The operating apparatus 26 is provided near the operator's seat of the cabin 10, and is an operation input means for operating operational elements (such as the lower traveling body 1, the upper turning body 3, the boom 4, the arm 5, and the bucket 6) by the operator. In other words, the operating apparatus 26 is an operation input means for operating the hydraulic actuators (such as the traveling hydraulic motors 1A and 1B, the boom cylinder 7, the arm cylinder 8, the bucket cylinder 9), and an electric actuator (the turning electric motor 21), which drive the respective operational elements. Hereinafter, the description will be given based on the assumption that the operations of the attachment including the boom 4, the arm 5, and the bucket 6 and the operation of the upper turning body 3 are performed by the levers 26A and 26B. The operating apparatus 26 (the levers 26A and 26B, and the pedal 26C) is connected to the control valve 17 via a hydraulic line 27. The control valve 17 receives a pilot signal (pilot pressure) corresponding to the state of operation of each of the lower traveling body 1, the boom 4, the arm 5, and the bucket 6 performed with the operating apparatus 26. Accordingly, the control valve 17 can drive each of the hydraulic actuators in accordance with the state of operation performed with the operating apparatus 26. The operating apparatus 26 is connected to the pressure sensor 29 via a hydraulic line 28.

As described above, the pressure sensor 29 is connected to the operating apparatus 26 via the hydraulic line 28, detects the secondary-side pilot pressure of the operating apparatus 26, i.e., the pilot pressure corresponding to the state of operation of each of the operational elements (the hydraulic actuators and the electric actuator) performed with the operating apparatus 26. The pressure sensor 29 is communicably connected to the controller 30 through a one-to-one communication line or an in-vehicle network such as a CAN. A pressure signal (a detected value of the pilot pressure) corresponding to the state of operation of each of the lower traveling body 1, the upper turning body 3, the boom 4, the arm 5, and the bucket 6 performed with the operating apparatus 26 is input into the controller 30.

The control system of the shovel 500 according to this embodiment includes a controller 30, an ECM 75, an engine speed sensor 11a, the inverter 18A, the inverter 18B, a current sensor 21s, and the resolver 22. The control system of the shovel 500 according to this embodiment includes, as a configuration about a turning automatic control explained later, a boom angle sensor 40, an arm angle sensor 42, a teaching mode switch 44, a teaching data setting switch 46, and an automatic mode switch 48.

The controller 30 is a control device that performs drive control of the shovel 500. For example, the controller 30 performs drive control of the engine 11 via the ECM 75 based on a work mode or the like set in advance by a predetermined operator's operation or the like. The controller 30 controls the driving of the electric motor 12 and the turning electric motor 21 via the inverters 18A, 18B, on the basis of a detected value of the pilot pressure, received from the pressure sensor 29, corresponding to the state of operation of each of operation elements (i.e., various hydraulic actuators and the electric actuator) performed with the operating apparatus 26. In addition, as described above, the controller 30 performs switching control between the step-up operation and the step-down operation of the buck-boost converter 110 on the basis of the detected voltage value of the DC bus 100, the detected voltage value of the capacitor 19, and the detected current value of the capacitor 19. The controller 30 automatically controls the turning operation of the upper turning body 3 so that the bucket 6 automatically performs an operation according to predetermined teaching data, in accordance with an operation of the attachment including the boom 4 and the arm 5 performed by an operator with the use of the operating apparatus 26 or without relying on an operator's operation. Hereinafter, the control mode of the upper turning body 3 by the controller 30 is referred to as "turning automatic control". The details of the "turning automatic control" by the controller 30 will be described later.

The functions of the controller 30 may be achieved by any hardware, software, or a combination thereof. For example, the controller 30 is constituted by a microcomputer including a CPU (Central Processing Unit), a ROM (Read Only Memory), a RAM (Random Access Memory), an auxiliary storage device, an I/O (Input-Output interface), and the like. Various functions are achieved by causing the CPU to execute various programs stored in the ROM and the auxiliary storage device.

Some of the functions of the controller 30 may be achieved by another controller. That is, the function of the controller 30 may be achieved as being distributed across multiple controllers.

The ECM 75 drives and controls the engine 11 based on the control instruction from the controller 30. For example, the ECM 75 generates a torque instruction of the engine 11 so as to cause the engine 11 to constantly rotate at a target rotational speed corresponding to the control instruction from the controller 30, on the basis of a measured value of the rotational speed of the engine 11 corresponding to the detection signal received from the engine speed sensor 11a. Then, the ECM 75 outputs, to actuators such as a fuel injection device and the like of the engine 11, a drive instruction for causing the engine 11 to generate a torque according to the generated torque instruction.

The engine speed sensor 11a is a known detection means for detecting the rotational speed of the engine 11. The engine speed sensor 11a is communicably connected to the ECM 75 through a one-to-one communication line or an in-vehicle network such as a CAN. A detection signal corresponding to the rotational speed of the engine 11 is input into the ECM 75.

Using the electric power storage system 120, the inverter 18A outputs a three-phase alternate current power that drives the electric motor 12, and conversely, supplies the power generated by the electric motor 12 to the electric power storage system 120. Specifically, in the inverter 18A, a built-in drive circuit (not illustrated) generates a drive instruction, for example, a PWM (Pulse Width Modulation) instruction, based on a control instruction received from the controller 30 (specifically, a speed instruction for performing a constant rotation at a predetermined rotational speed). Then, in the inverter 18A, based on the drive instruction, a built-in inverter circuit (not illustrated) converts a power supplied from the electric power storage system 120 into a three-phase alternate current power that drives the electric motor 12, or conversely, converts a power generated by the electric motor 12 into a direct current power and supplies the direct current power to the electric power storage system 120.

The drive circuit for driving the inverter circuit of the inverter 18A may be provided outside the inverter 18A, for example, in the controller 30.

Using the electric power storage system 120 as a power source, the inverter 18B outputs a three-phase alternate current power for driving the turning electric motor 21, and conversely, supplies a power generated by the turning electric motor 21 to the electric power storage system 120. Specifically, in the inverter 18B, a built-in drive circuit (not illustrated) generates a drive instruction, for example, a PWM (Pulse Width Modulation) instruction, based on a control instruction received from the controller 30. Specifically, the drive circuit may generate a drive instruction by performing speed/torque feedback control or position/torque feedback control, on the basis of the rotational speed or rotation position (rotation angle) of the turning electric motor 21, received from the resolver 22 and the current sensor 21s, and a measured value of an output torque. Then, in the inverter 18B, based on the drive instruction, a built-in inverter circuit (not illustrated) converts a power supplied from the electric power storage system 120 into a three-phase alternate current power that drives the turning electric motor 21, or conversely, converts a power generated by the turning electric motor 21 into a direct current power and supplies the direct current power to the electric power storage system 120.

The drive circuit for driving the inverter circuit of the inverter 18B may be provided outside the inverter 18B, for example, in the controller 30.

The current sensor 21s detects the current of each of the three phases (U phase, V phase, W phase) of the turning electric motor 21. The current sensor 21s is provided, for example, in a power path between the turning electric motor 21 and the inverter 18B. The current sensor 21s is communicably connected to the inverter 18B through a one-to-one communication line or an in-vehicle network such as a CAN. A detection signal corresponding to the current of each of the three phases of the turning electric motor 21 detected by the current sensor 21s is input into the inverter 18B.

The current sensor 21s may be built in the inverter 18B to detect the current output from the inverter 18B. In addition, the current sensor 21s may detect the currents of two phases out of the three phases and calculate the current of the remaining one phase from the detected current values of the two phases. The current value of the remaining one phase may be calculated by the inverter 18B (specifically, the drive circuit described above) based on the detection signals corresponding to the current values of two phases input into the inverter 18B.

The resolver 22 detects the rotation position of the turning electric motor 21, i.e., the rotation angle with respect to a predetermined reference position in the rotation direction, and the like. In other words, the resolver 22 detects a turning angle with respect to a predetermined reference position in the turning direction of the upper turning body 3 (for example, the turning position of the upper turning body 3 when the extension direction of the boom 4 and the like is the same as the traveling direction of the lower traveling body 1) (hereinafter simply referred to as "turning angle"). The resolver 22 is communicably connected to the inverter 18B through a one-to-one communication line or an in-vehicle network such as a CAN. A detection signal corresponding to the detected rotation angle (turning angle) is input into the inverter 18B.

The boom angle sensor 40 detects an elevation angle of the boom 4 with respect to the upper turning body 3, for example, an angle formed by the boom 4 with respect to the turning plane of the upper turning body 3 (hereinafter referred to as "boom angle"). The boom angle sensor 40 may include, for example, a rotary encoder, an acceleration sensor, an angle acceleration sensor, a six-axis sensor, an IMU (Inertial Measurement Unit), and the like, and hereinafter, this is also applicable to the arm angle sensor 42 and a bucket angle sensor described later. The boom angle sensor 40 is communicably connected to the controller 30 through a one-to-one communication line or an in-vehicle network such as a CAN. A detection signal corresponding to the boom angle is input into the controller 30.

The arm angle sensor 42 detects an orientation angle of the arm 5 with respect to the boom 4, for example, an angle formed by the arm 5 with respect to the boom 4 (hereinafter referred to as "arm angle"). The arm angle sensor 42 is communicably connected to the controller 30 through a one-to-one communication line or an in-vehicle network such as a CAN. A detection signal corresponding to the arm angle is input into the controller 30.

It should be noted that, in addition to the boom angle sensor 40 and the arm angle sensor 42, a bucket angle sensor may be further provided to detect an orientation angle of the bucket 6 with respect to the arm 5, for example, an angle of the bucket 6 with respect to the arm 5 (hereinafter referred to as "bucket angle").

The teaching mode switch 44 (an example of a teaching mode setting operation unit) is an operation unit provided inside the cabin 10 to set the operation mode of the shovel 500 to "teaching mode" by an ON/OFF operation or the like by the operator. The "teaching mode" is an operation mode of the shovel 500 for setting the teaching data used in the turning automatic control described above. In the "teaching mode", the turning automatic control is disabled. That is, in the "teaching mode", the turning operation of the upper turning body 3 is controlled by the controller 30 in accordance with an operator's operation with the operating apparatus 26 as usual. The teaching mode switch 44 may be an operation unit achieved with hardware such as a push button, or may be an operation unit achieved with software such as a button icon and the like displayed on a predetermined display apparatus (for example, a touch panel display and the like mounted in a cabin 10). Hereinafter, this is also applicable to the teaching data setting switch 46 and the automatic mode switch 48. The teaching mode switch 44 is communicably connected to the controller 30 through a one-to-one communication line or an in-vehicle network such as a CAN. A signal corresponding to the state of operation (an ON signal or an OFF signal) is input into the controller 30.

It should be noted that the teaching data may be set by receiving corresponding data from an external apparatus (for example, a management server and the like for managing a work situation at a work site and an operation situation of a shovel at a work site) via a communication device mounted on the shovel 500, or receiving an operation input from an operator and the like. Specifically, the teaching data may be set without letting an operator and the like operate the attachment and the like of the shovel 500.

The teaching data setting switch 46 is an operation unit provided inside the cabin 10 to receive an operator's operation and the like for setting teaching data in the "teaching mode". The teaching data setting switch 46 is communicably connected to the controller 30 through a one-to-one communication line or an in-vehicle network such as a CAN. An operation signal corresponding to the state of operation of the teaching data setting switch 46 is input into the controller 30. A specific operation method and the like of the teaching data setting switch 46 will be described later.

The automatic mode switch 48 (an example of an automatic mode setting operation unit) is an operation unit provided inside the cabin 10 to set the operation mode of the shovel 500 to "automatic mode" according to an ON/OFF operation and the like by the operator. The "automatic mode" is an operation mode in which the above-described turning automatic control is effective. Hereinafter, in association with the "automatic mode", an operation mode in which the turning automatic control is not effective except for the "teaching mode", i.e., an operation mode in which, as usual, the turning operation of the upper turning body 3 is controlled by the controller 30 in accordance with an operator's operation with the operating apparatus 26 will be referred to as a "normal mode". The explanation about the "teaching mode" is based on the assumption that the "teaching mode" is included in the "normal mode". The automatic mode switch 48 is communicably connected to the controller 30 through a one-to-one communication line or an in-vehicle network such as a CAN. A signal (an ON signal or an OFF signal) corresponding to the state of operation is input into the controller 30.

[Details of Configuration of Turning Control Apparatus]

Figure 3:
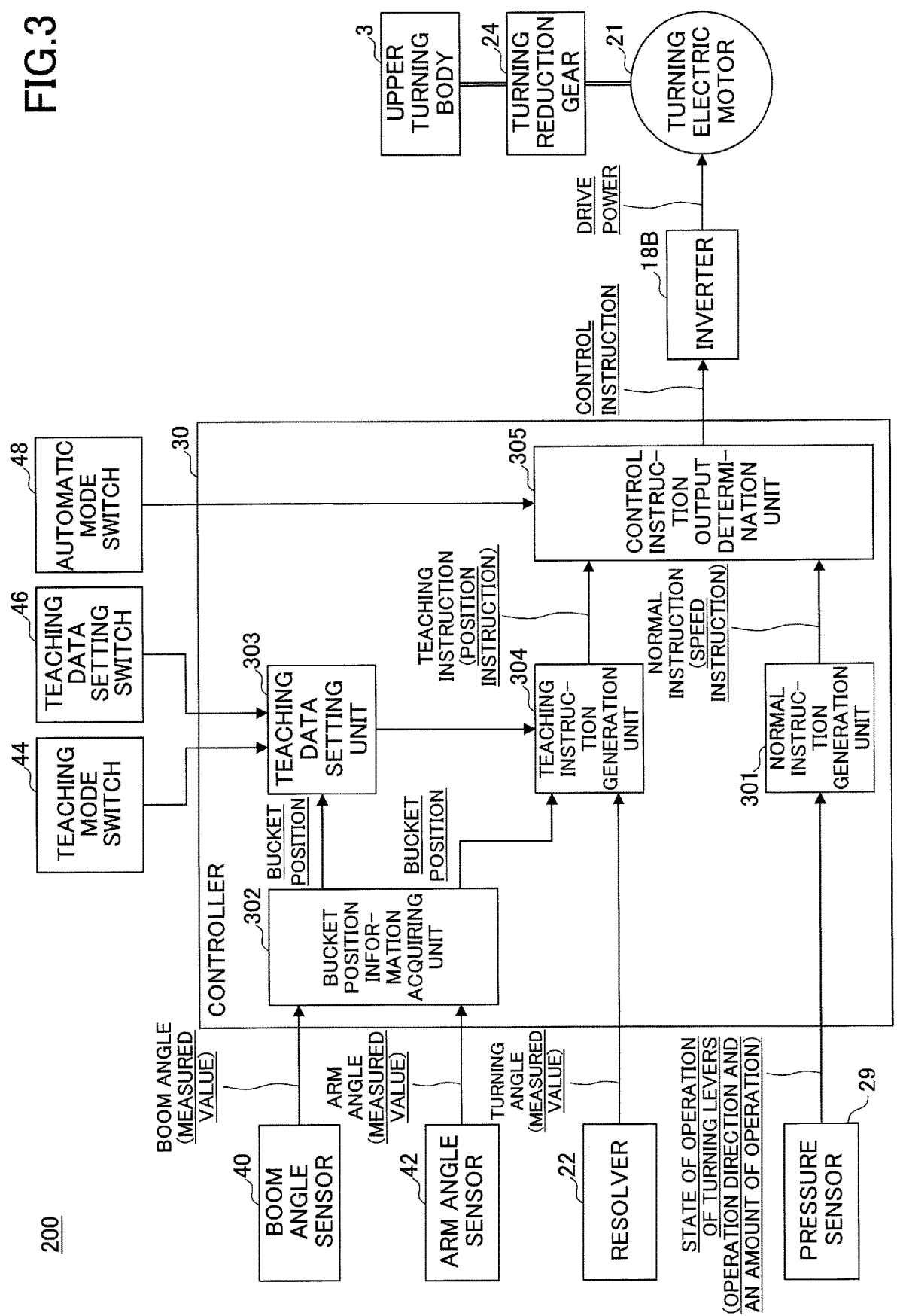
FIG. 3 is a functional block diagram illustrating an example of a functional configuration of the shovel.

Next, a detailed configuration of a turning control apparatus 200 mounted on the shovel 500 to control the turning operation of the upper turning body 3 will be described with reference to FIG. 3.

The turning control apparatus 200 includes the controller 30, the inverter 18B, the turning electric motor 21, the resolver 22, the pressure sensor 29, the boom angle sensor 40, the arm angle sensor 42, the teaching mode switch 44, the teaching data setting switch 46, and the automatic mode switch 48.

The controller 30 includes, as functional units associated with control of the turning operation of the upper turning body 3, a normal instruction generation unit 301, a bucket position information acquiring unit 302, a teaching data setting unit 303, a teaching instruction generation unit 304, and a control instruction output determination unit 305.

The normal instruction generation unit 301 generates a speed instruction, as a normal control instruction for controlling the upper turning body 3 (hereinafter referred to as "normal instruction"), on the basis of the state of operation of the upper turning body 3 with the lever 26A received from the pressure sensor 29, i.e., an operation direction and an amount of operation of the lever 26A.

A bucket position information acquiring unit 302 acquires information (bucket position information) about a position of the bucket 6 (hereinafter simply referred to as "bucket position") relative to the lower traveling body 1 in a plan view in which the shovel 500 is seen from directly above along the turning center axis of the upper turning body 3 (hereinafter simply referred to as "plan view"). For example, the bucket position information acquiring unit 302 acquires, as bucket position information, a coordinate in a diameter direction (radial coordinate) and a coordinate in a circumferential direction (angular coordinate) corresponding to the bucket position in a plane polar coordinate system in which the origin is on the turning center axis of the upper turning body 3 as seen in the plan view. Specifically, the bucket position information acquiring unit 302 calculates, as a radial coordinate corresponding to the bucket position, a horizontal distance from the turning center axis of the upper turning body 3 to the bucket 6 (hereinafter simply referred to as "the horizontal distance to the bucket 6") on the basis of a distance from the turning center axis of the upper turning body 3 to the pivot position of the boom 4 as seen in the plan view (hereinafter a distance as seen in the plan view will be referred to as a "horizontal distance"), link lengths of the boom 4 and the arm 5 (lengths between pivot positions at both ends), and a boom angle and an arm angle received from the boom angle sensor 40 and the arm angle sensor 42, respectively. The distance to the pivot position of the boom 4, the link length, the boom angle, and the arm angle are known. The bucket position information acquiring unit 302 acquires, as the angular coordinate corresponding to the bucket position, the turning angle of the upper turning body 3 received from the resolver 22. The bucket position information acquiring unit 302 outputs, to a teaching data setting unit 303 and the teaching instruction generation unit 304, information about the acquired bucket position, i.e., the horizontal distance of the bucket 6 corresponding to the bucket position and the turning angle of the upper turning body 3.

In a case where the "teaching mode" is set, the teaching data setting unit 303 sets teaching data in accordance with an operation of the teaching data setting switch 46 performed by an operator. Specifically, as explained below, the teaching data setting unit 303 sets teaching data defining a direction in which the bucket 6 is moved, i.e., sets the teaching axis, in accordance with an operation of the teaching data setting switch 46 performed by an operator's operation. The details of the operation of the teaching data setting unit 303 will be explained later (see FIG. 5 and FIG. 8).

The teaching instruction generation unit 304 (an example of a control unit) generates a control instruction (hereinafter referred to as "teaching instruction") for automatically turning the upper turning body 3, so that, in the plan view, the bucket 6 moves along the set teaching axis in accordance with an operation of the attachment including the boom 4 and the arm 5 performed by an operator with the operating apparatus 26. For example, the teaching instruction generation unit 304 identifies the turning operation for moving the bucket 6 along the teaching axis in the plan view in accordance with a change in the bucket position received from the bucket position information acquiring unit 302. Specifically, the teaching instruction generation unit 304 calculates a target value (target turning angle) of the turning position (turning angle) corresponding to the identified turning operation, and generates a position instruction corresponding to the target turning angle as the teaching instruction. The details of the operation of the teaching instruction generation unit 304 will be described later (see FIG. 6, FIG. 7, and FIG. 9).

A control instruction output determination unit 305 outputs, as the control instruction to the inverter 18B, any one of the normal instruction and the teaching instruction generated by the normal instruction generation unit 301 and the teaching instruction generation unit 304, respectively. Specifically, in a case where the automatic mode switch 48 is in the OFF state, i.e., in a case where the operation mode of the shovel 500 is other than the "automatic mode", for example, the "normal mode" and the "teaching mode", the control instruction output determination unit 305 outputs a normal instruction to the inverter 18B. In a case where the automatic mode switch 48 is in the ON state, i.e., in a case where the operation mode of the shovel 500 is the "automatic mode", the control instruction output determination unit 305 outputs a teaching instruction to the inverter 18B. Accordingly, turning automatic control of the upper turning body 3 can be achieved via the inverter 18B.

[First Example of Operation of Shovel in Automatic Mode]

Next, the first example of an operation of the shovel in an automatic mode will be explained with reference to FIG. 4 to FIG. 9.

<Teaching Data Setting Method>

First, a setting method of teaching data performed by the teaching data setting unit 303 will be explained with reference to FIG. 4 and FIG. 5.

Figure 4:
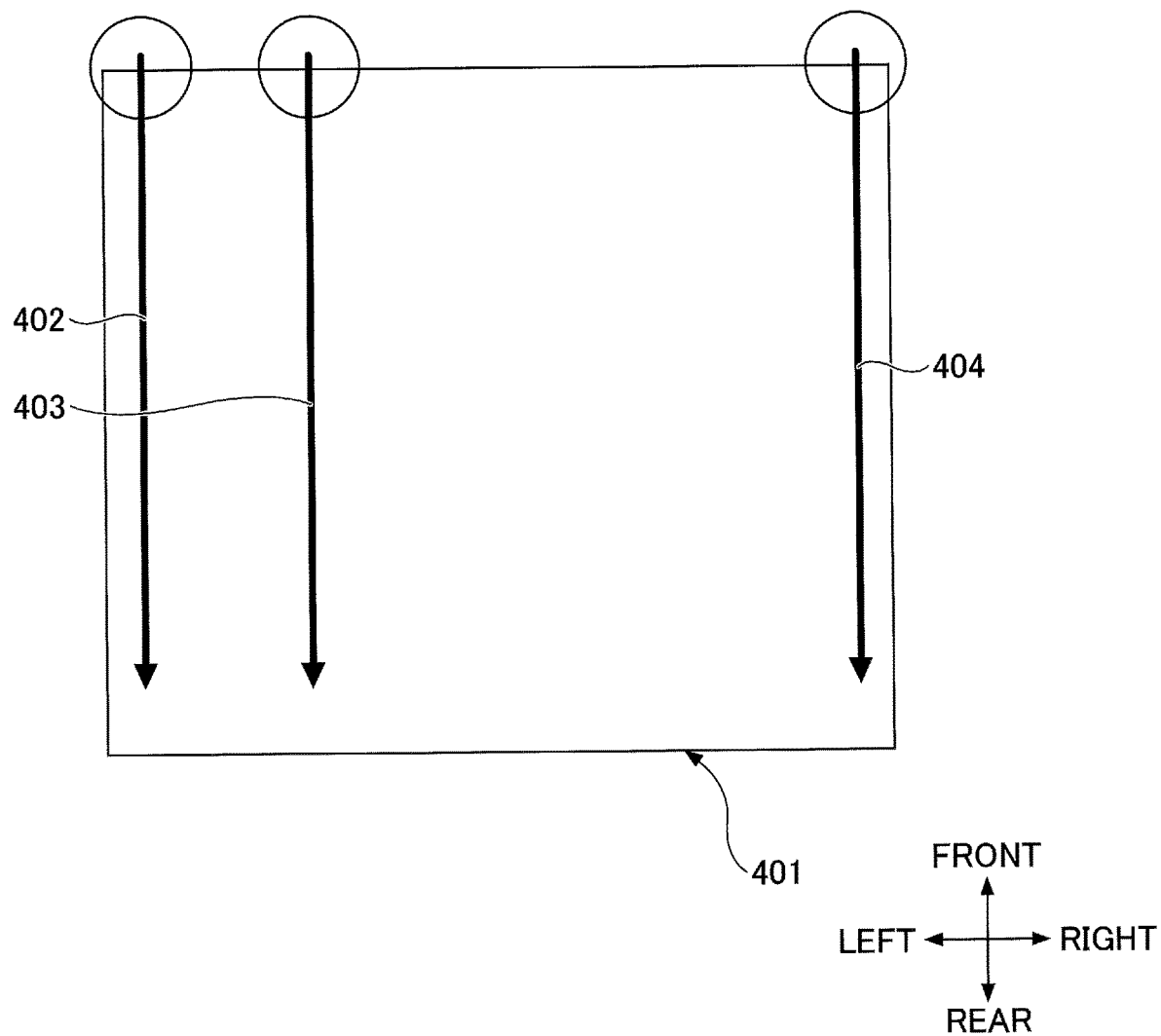
FIG. 4 is a drawing illustrating an example of construction work of the shovel.

FIG. 4 is a drawing illustrating an example of construction work with the shovel 500. FIG. 5 is a drawing illustrating an example of a setting method of teaching data (teaching axis) in a teaching mode.

As illustrated in FIG. 4, in this example, on a construction target surface 401 in a substantially rectangular shape in the plan view, which is a construction target of construction work such as excavation work, leveling work, and the like, the shovel 500 performs construction such as excavating, leveling, and the like in line segments 402 to 404 parallel to a side of the construction target surface 401 in a front-rear direction. The construction target surface 401 may be a substantially horizontal surface or an inclined land where a slope is to be constructed (for example, see FIG. 13A). This is also applicable to construction target surfaces 1001 and 1101 described later.

Figure 5:
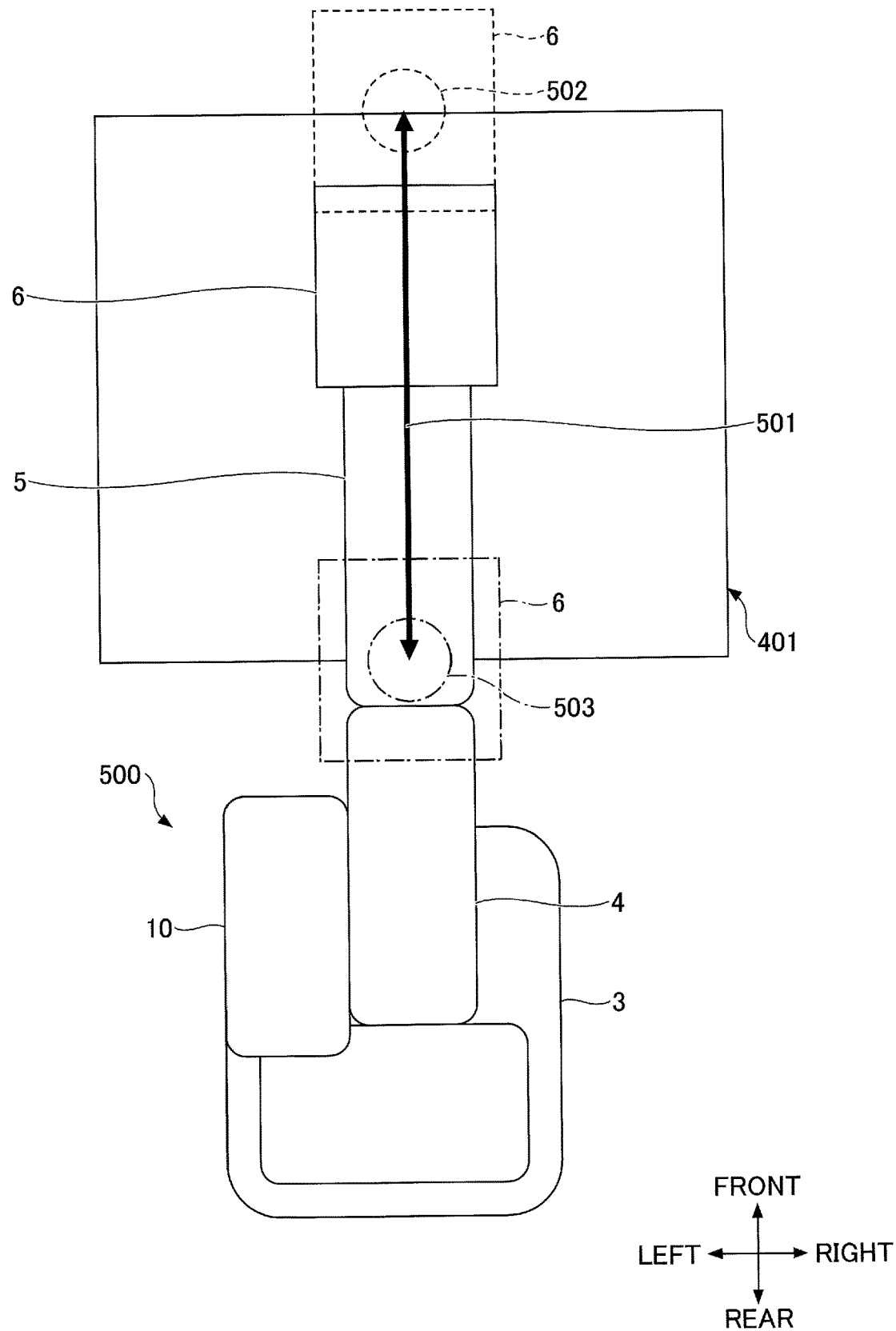
FIG. 5 is a drawing illustrating an example of a setting method of teaching data (teaching axis) in a teaching mode.

In this case, as illustrated in FIG. 5, an operator operates the attachment including the boom 4, the arm 5, and the bucket 6 of the shovel 500 using the operating apparatus 26, and sets a teaching axis 501 parallel to a side of the construction target surface 401 in the front-rear direction.

For example, first, an operator moves the shovel 500 so that the extension direction of the boom 4, the arm 5, and the bucket 6 (the attachment) with respect to the upper turning body 3 is substantially in parallel to a side of the construction target surface 401 in the front-rear direction.

Substantially, an operator performs an operation, with the operating apparatus 26, to extend the arm 5 while lowering the boom 4, so that, in the plan view, the bucket 6 comes to a position relatively away from the upper turning body 3 (for example, a position 502 in FIG. 5). Then, an operator operates the teaching data setting switch 46 in a state in which the bucket 6 is at the position 502 (a state indicated by a dotted line in FIG. 5). Accordingly, the teaching data setting unit 303 sets, as a first end point (start point) of a line segment defining the teaching axis 501, the position 502 of the bucket 6 in the plan view, on the basis of the bucket position information received from the bucket position information acquiring unit 302 (i.e., the horizontal distance of the bucket 6 and the turning angle of the upper turning body 3).

Subsequently, an operator performs an operation, with the operating apparatus 26, to retract the arm 5 while raising the boom 4, so that, in the plan view, the bucket 6 comes to a position relatively close to the upper turning body 3 (for example, a position 503 in FIG. 5). Then, an operator operates the teaching data setting switch 46 in a state in which the bucket 6 is at the position 503 (a state indicated by an alternate long and short dash line in FIG. 5).

Accordingly, the teaching data setting unit 303 sets, as a second end point (end point) of the line segment defining the teaching axis 501, the position 503 of the bucket 6 in the plan view, on the basis of the bucket position information received from the bucket position information acquiring unit 302. Then, the teaching data setting unit 303 can set the teaching axis 501 from the start point to the end point thus set. For example, the teaching data setting unit 303 may set, as the teaching axis 501, a vector (teaching vector) from the start point to the end point thus set.

<Details of Operation of Shovel in Automatic Mode>

Subsequently, a first example of an operation of the shovel 500 in automatic mode, more specifically, turning automatic control of the upper turning body 3 corresponding to this operation, will be explained more specifically with reference to FIG. 6 and FIG. V. Hereinafter, in this example, an explanation will be given based on the assumption of the above-explained construction work with the shovel 500 illustrated in FIG. 4 and based on the above-explained position of the shovel 500 and the set teaching axis 501 illustrated in FIG. 5.

Figure 6:
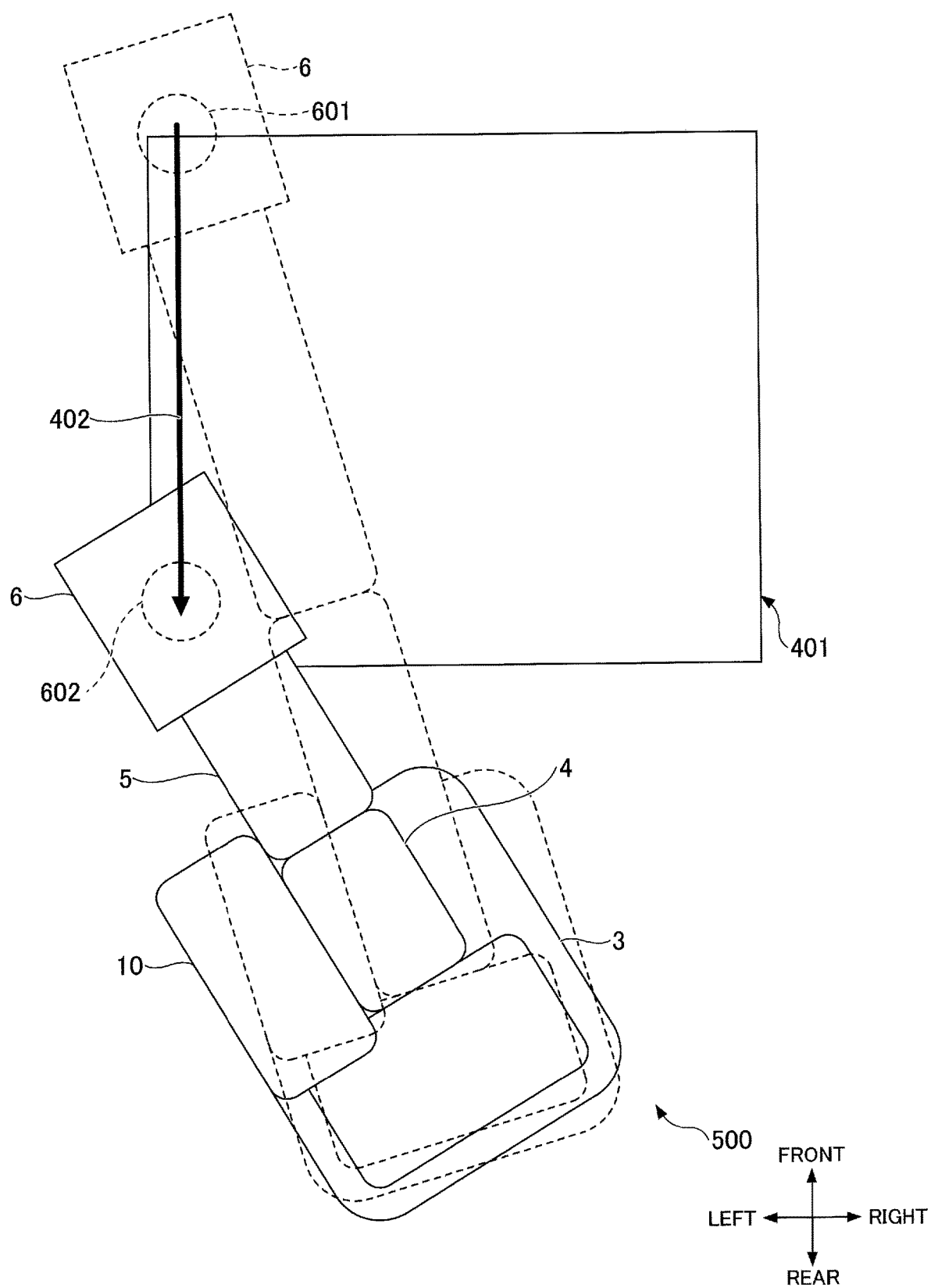
FIG. 6 is a drawing explaining a first example of an operation of the shovel in an automatic mode.
Figure 7:
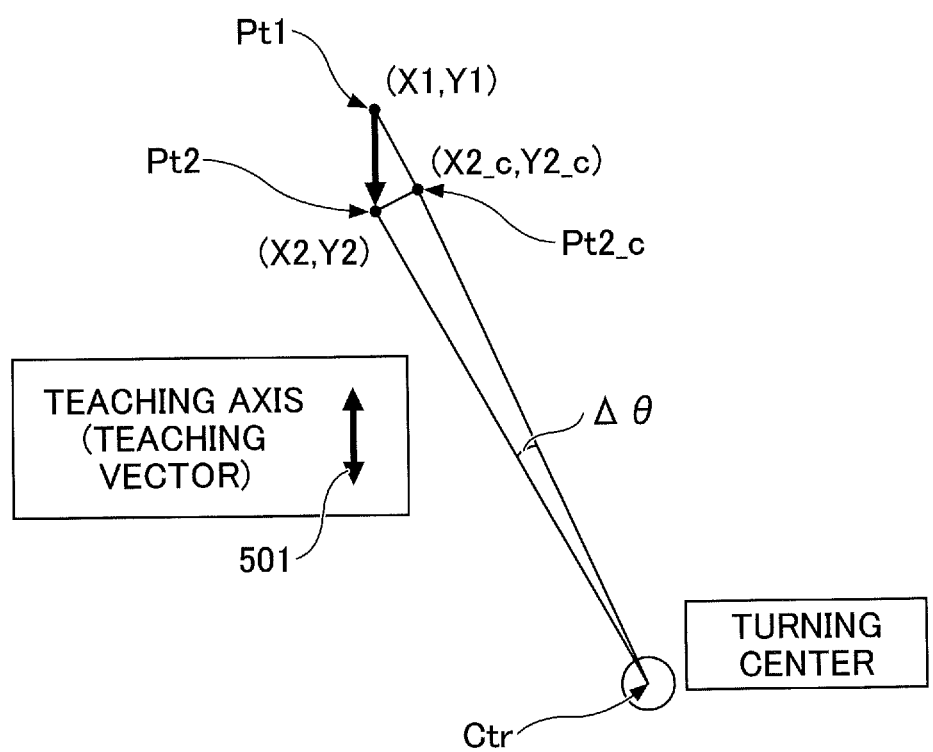
FIG. 7 is a drawing illustrating an example of a turning control method in the automatic mode.

FIG. 6 is a drawing explaining the first example of the operation of the shovel 500 in the automatic mode. Specifically, FIG. 6 is a drawing illustrating the operation of the shovel 500 in a case where a line segment 402 in a left end portion of the construction target surface 401 of FIG. 4 is excavated or levelled. FIG. 7 is a drawing illustrating an example of a turning control method in the automatic mode. Specifically, FIG. 7 is a drawing explaining a control method for moving the bucket 6 at a position Pt1 to a position Pt2 along the teaching axis 501 in a control cycle T in accordance with an operation of the attachment including the boom 4 and the arm 5 performed by an operator.

It should be noted that X coordinates and Y coordinates of positions Pt1, Pt2, Pt2_c in FIG. 7 are based on an orthogonal coordinate system in which the origin is on the turning center axis Ctr of the upper turning body 3.

As illustrated in FIG. 6, the shovel 500 is arranged near the center, in a left-and-right direction, on the rear part of the construction target surface 401, in a state in which the teaching axis 501 is set, i.e., still in a state of FIG. 5. This is to facilitate construction work for the line segments 402 to 404 ranging from the right to the left of the construction target surface 401 of FIG. 4.

An operator performs an operation, with the operating apparatus 26, to lower the boom 4 and extend the arm 5 while turning the upper turning body 3 in the left direction, so that the position of the bucket 6 comes to an end point at the front of the line segment 402, i.e., the position of the bucket 6 is aligned with a start point position 601 of the construction work.

Subsequently, an operator performs an operation, with the operating apparatus 26, to retract the arm 5 while raising the boom 4, so that the bucket 6 is moved from the start point position 601 toward the shovel 500, i.e., the bucket 6 is moved to the rear, in order to perform excavation work, leveling work, or the like. In this example, since the automatic mode is set, as described above, the teaching instruction is output to the inverter 18B from the control instruction output determination unit 305. Therefore, the upper turning body 3 automatically turns in a left direction in accordance with an operation of the attachment including the boom 4 and the arm 5 performed with the operating apparatus 26 by an operator, so that, in the plan view, the bucket 6 moves along the teaching axis 501, i.e., the bucket 6 moves on the line segment 402. Accordingly, with just an operation of the attachment including the boom 4 and the arm 5, an operator can perform excavation and leveling from the start point position 601 to the end point position 602 on the line segment 402 along a direction different from the movement direction of the bucket 6 in the plan view as seen from the shovel 500.

Herein, as illustrated in FIG. 7, when, usually, only the boom 4, the arm 5, and the bucket 6 are operated in a state in which the bucket 6 is at the position Pt1, the bucket 6 moves, during the control cycle T, to the position Pt2_c which is in the extension direction of the attachment such as the boom 4 with respect to the upper turning body 3. Therefore, the teaching instruction generation unit 304 calculates a correction amount Δθ of the turning angle during the control cycle T on the basis of a latest change and the like of the bucket position and the turning angle, and sets a target turning angle in view of the correction amount Δθ for the current turning angle. Therefore, with just an operation of the attachment including the boom 4 and the arm 5 by an operator, the teaching instruction generation unit 304 allows movement from the position Pt1 to the position Pt2 along the teaching axis 501.

It should be noted that the teaching instruction generation unit 304 may calculate the correction amount Δθ on the basis of not only a change in the bucket position and the turning angle but also the state of operation of the boom 4, the arm 5, and the bucket 6 received from the pressure sensor 29. Therefore, since prediction accuracy of operations of the boom 4, the arm 5, and the bucket 6 in response to an operation performed with the operating apparatus 26 by an operator can be improved, the correction amount Δθ can be calculated more accurately, and the followability of the operation of the bucket 6 with respect to the teaching axis 501 can be improved. The work surface on which the shovel 500 performs work, i.e., the construction target surface 401, may be inclined. Therefore, the teaching instruction generation unit 304 may calculate the correction amount Δθ, for example, on the basis of an inclination of the work surface of the shovel 500 detected by an inclination sensor (an example of an inclination detection unit), not illustrated, mounted on the lower traveling body 1 and the upper turning body 3. This is because the operation speeds and the like of the boom 4, the arm 5, and the like may change according to the inclination state of the work surface.

In this manner, even in a case where an extension direction of the attachment such as the boom 4 as seen from the shovel 500, i.e., a movement direction of the bucket 6 in the plan view, does not match a direction of linear construction work such as excavation work, leveling work, and the like, an operator can perform linear construction work by just operating the levers 26A and 26B corresponding to the attachment including the boom 4 and the arm 5. Therefore, the work efficiency of construction work can be improved.

It should be noted that in a case where an operator finishes the work of the line segment 402 and proceeds to work for the line segments 403, 404, the operator can cancel the automatic mode by turning OFF the automatic mode switch 48. Therefore, the operator can adjust the position of the bucket 6 to the start point positions of the construction work for the line segments 403, 404, while turning the upper turning body 3 by the operator's operation.

<Details of Teaching Data Setting Processing>

Subsequently, the processing flow for setting the teaching data with the teaching data setting unit 303 of the controller 30 will be specifically described with reference to FIG. 8.

Figure 8:
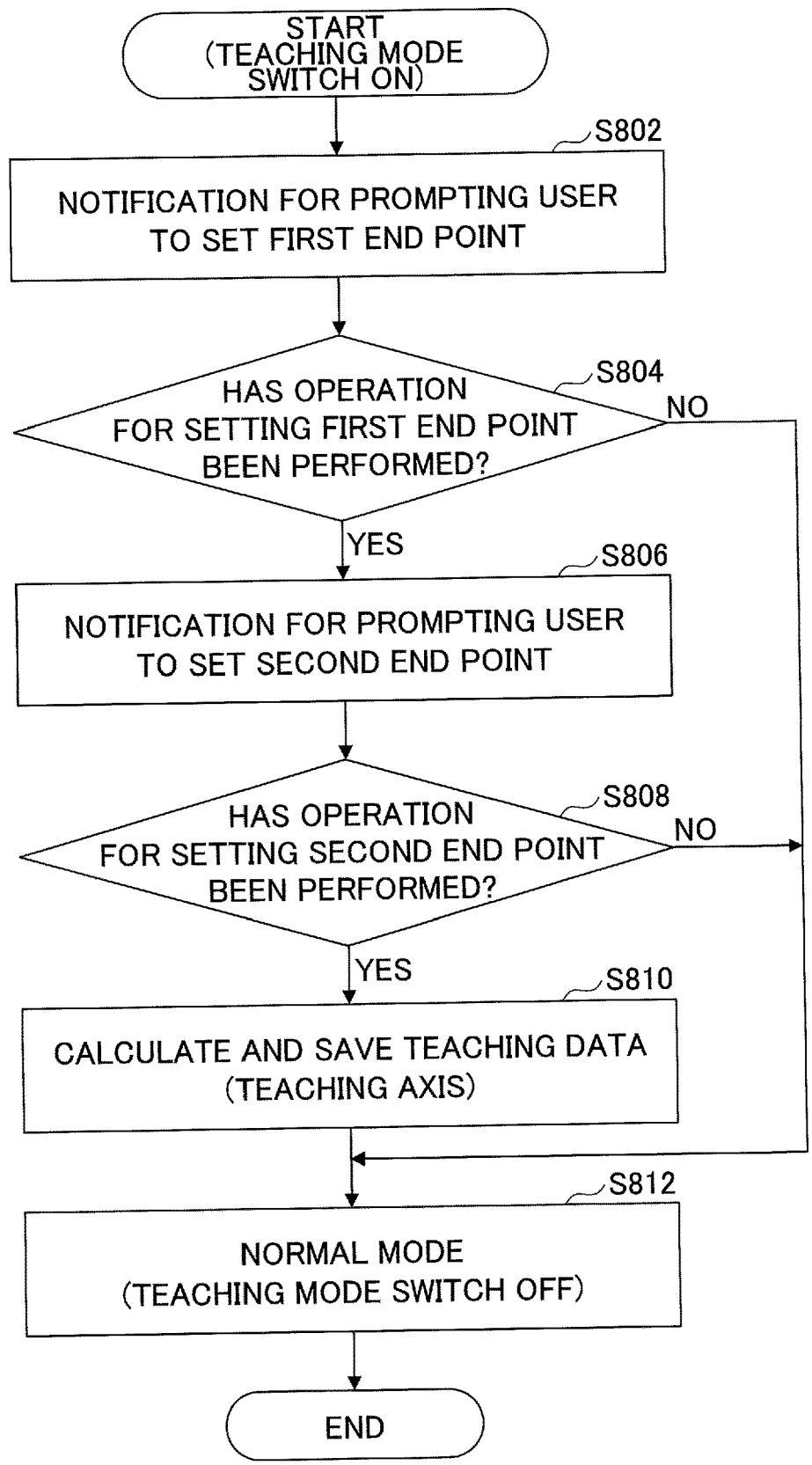
FIG. 8 is a flowchart schematically illustrating an example of teaching data setting processing by a controller.

FIG. 8 is a flowchart schematically illustrating an example of teaching data setting processing performed with the teaching data setting unit 303 of the controller 30. The processing according to this flowchart is executed in a case where the teaching mode switch 44 is turned ON, i.e., an operation signal received from the teaching mode switch 44 switches from an OFF signal to an ON signal.

In step S802, the teaching data setting unit 303 gives a notification for prompting an operator and the like to set a first end point. For example, the teaching data setting unit 303 may display a notification content on a display apparatus (not illustrated) provided in the cabin 10, or may output sound of a notification content via a sound output apparatus (not illustrated) provided in the cabin. The processing of step S806 is also similar.

In step S804, the teaching data setting unit 303 determines whether an operator and the like has performed, within a predetermined time, an operation for setting the first end point with the teaching data setting switch 46. In a case where an operator and the like is determined to have performed an operation for setting the first end point, the teaching data setting unit 303 proceeds to step S806, and in a case where an operator and the like is determined not to have performed an operation for setting the first end point, the teaching data setting unit 303 proceeds to step S812.

In a case where an operator and the like is determined not to have performed, within the predetermined time, an operation for setting the first end point with the teaching data setting switch 46, the teaching data setting unit 303 may return back to step S802 again to execute retry processing for repeating steps S802, S804. In this case, the number of times the retry processing is executed may be limited. Hereinafter, similar retry processing may also be performed for the processing of steps S806, S808.

In step S806, the teaching data setting unit 303 gives a notification for prompting an operator and the like to set a second end point.

In step S808, the teaching data setting unit 303 determines whether an operator and the like has performed, within a predetermined time, an operation for setting the second end point with the teaching data setting switch 46. In a case where an operator and the like is determined to have performed an operation for setting the second end point, the teaching data setting unit 303 proceeds to step S810, and in a case where an operator and the like is determined not to have performed an operation for setting the second end point, the teaching data setting unit 303 proceeds to step S812.

In step S810, the teaching data setting unit 303 calculates (sets) the teaching axis from the first end point and the second end point thus set, and saves the teaching axis in an internal memory such as an auxiliary storage device and the like in the controller 30.

In step S812, the teaching data setting unit 303 turns OFF the teaching mode switch 44, i.e., cancels the "teaching mode" to return the operation mode of the shovel 500 back to the "normal mode" and terminates the current processing.

Once the teaching axis has been set, its setting state is maintained during the operation of the shovel unless the processing according to this flowchart is performed again. This eliminates the need to perform the work of setting the teaching axis each time the work is performed in the "teaching mode", thereby improving the convenience of an operator and the like.

<Details of Turning Automatic Control Processing>

Subsequently, the processing flow for turning automatic control performed with the controller 30 will be specifically described with reference to FIG. 9.

Figure 9:
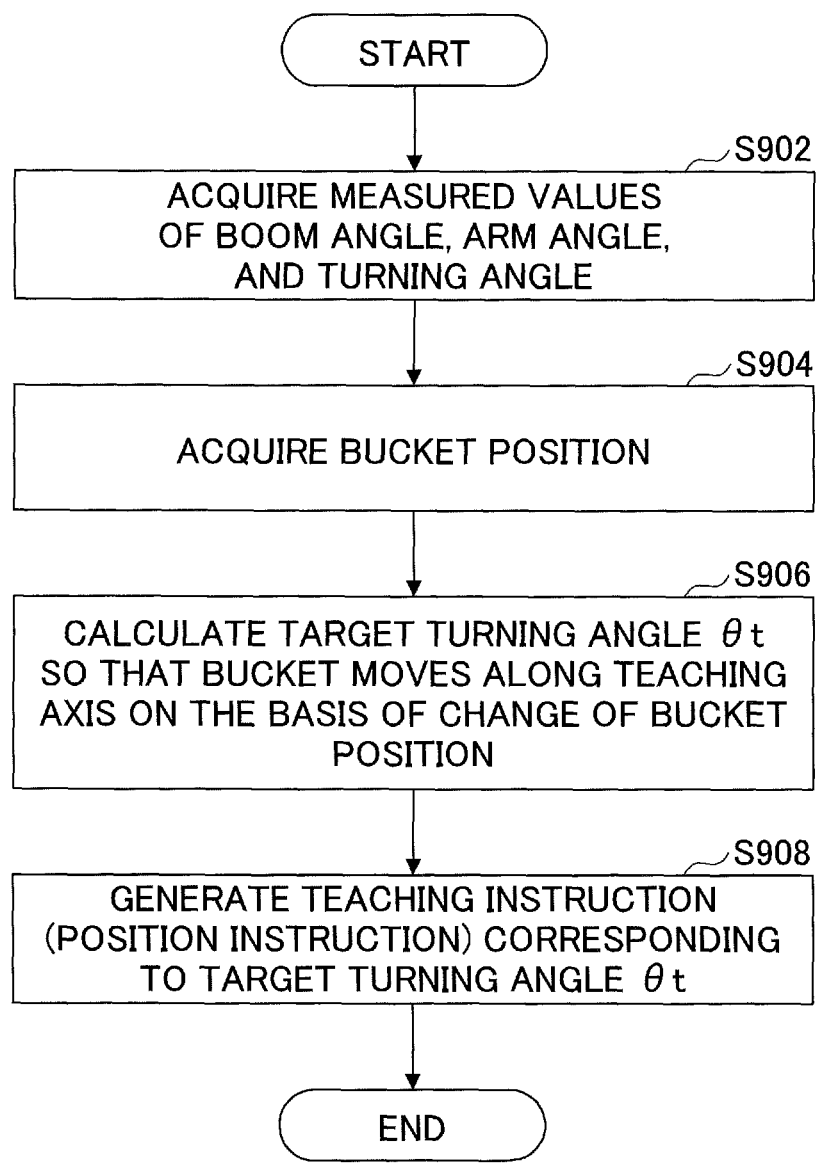
FIG. 9 is a flowchart schematically illustrating an example of turning automatic control processing by the controller.

FIG. 9 is a flowchart schematically illustrating an example of turning automatic control processing performed with the controller 30. For example, the processing according to this flowchart is repeatedly executed with a predetermined time, i.e., with a predetermined control cycle T during operation of the shovel 500.

In step S902, the bucket position information acquiring unit 302 acquires the measured values of the boom angle, the arm angle, and the turning angle received from the boom angle sensor 40, the arm angle sensor 42, and the resolver 22, respectively.

In step S904, the bucket position information acquiring unit 302 acquires (calculates) the bucket position on the basis of the measured values of the boom angle, the bucket angle, and the turning angle.

In step S906, on the basis of a latest change of the bucket position, a latest change of the turning angle, and the like, the teaching instruction generation unit 304 calculates the target turning angle θt so that the bucket 6 moves along the teaching axis.

In step S908, the teaching instruction generation unit 304 generates teaching instruction (position instruction) corresponding to the target turning angle θt, outputs the teaching instruction (position instruction) to the control instruction output determination unit 305, and terminates the current processing. Therefore, in a case where the "automatic mode" is set as the operation mode of the shovel 500, the teaching instruction is output from the control instruction output determination unit 305 to the inverter 18B.

In this example (FIG. 4 to FIG. 9), the turning operation of the upper turning body 3 is controlled so that the bucket 6 moves along a predetermined axis in the plan view in response to an operation of the attachment by an operator. Alternatively, the operation of the attachment may also be automated. Specifically, not only the turning operation of the upper turning body 3, but also the operation of the attachment may also be automated.

Specifically, the controller 30 automatically generates an operation input to the levers 26A and 26B corresponding to the excavation operation or leveling operation to retract the bucket 6 toward the upper turning body 3 while keeping the position of the bucket 6 almost constant in the height direction. Accordingly, the controller 30 can automatically control the operation of the attachment. In addition, the controller 30 may control the turning operation of the upper turning body 3 so that the bucket 6 moves along a predetermined axis in the plan view in accordance with the position of the bucket 6 corresponding to the automatic control of the attachment and in response to an operation input to the levers 26A and 26B. Accordingly, the shovel 500 can automatically perform linear construction work without relying on an operation input by an operator. In a case where the shovel 500 is caused to repeatedly perform the linear construction work as illustrated in FIG. 4 explained above, for example, coordinates of the start point position and the end point position in the plane polar coordinate system in which the origin is on the turning center axis of the upper turning body 3 may be set in advance in an internal memory and the like of the controller 30. Accordingly, the controller 30 can cause the shovel 500 to perform, in a full automatic manner, repeated linear construction work as illustrated in FIG. 4 explained above.

In this example, the bucket 6 is controlled to move along a predetermined axis (teaching axis) in the plan view. Alternatively, the bucket 6 may be controlled to move along a predetermined curve or bent line (hereinafter referred to as "teaching curve and the like"). In this case, as described above, teaching data corresponding to the teaching curve and the like may be set in response to an operation of the attachment and the like of the shovel 500. Alternatively, the teaching data of the teaching curve and the like may be set by receiving corresponding data from an external apparatus and receiving an operation input from an operator and the like, without relying on an operation of the attachment and the like of the shovel 500.

[Second Example of Operation of Shovel in Automatic Mode]

Subsequently, the second example of the operation of the shovel 500 in the automatic mode will be explained with reference to FIG. 10. In this example, like the first example explained above, the controller 30 (the teaching instruction generation unit 304) automatically turns the upper turning body 3 so that the bucket 6 moves along a predetermined teaching axis in the plan view in response to an operation of the attachment with the operating apparatus 26.

Figure 10:
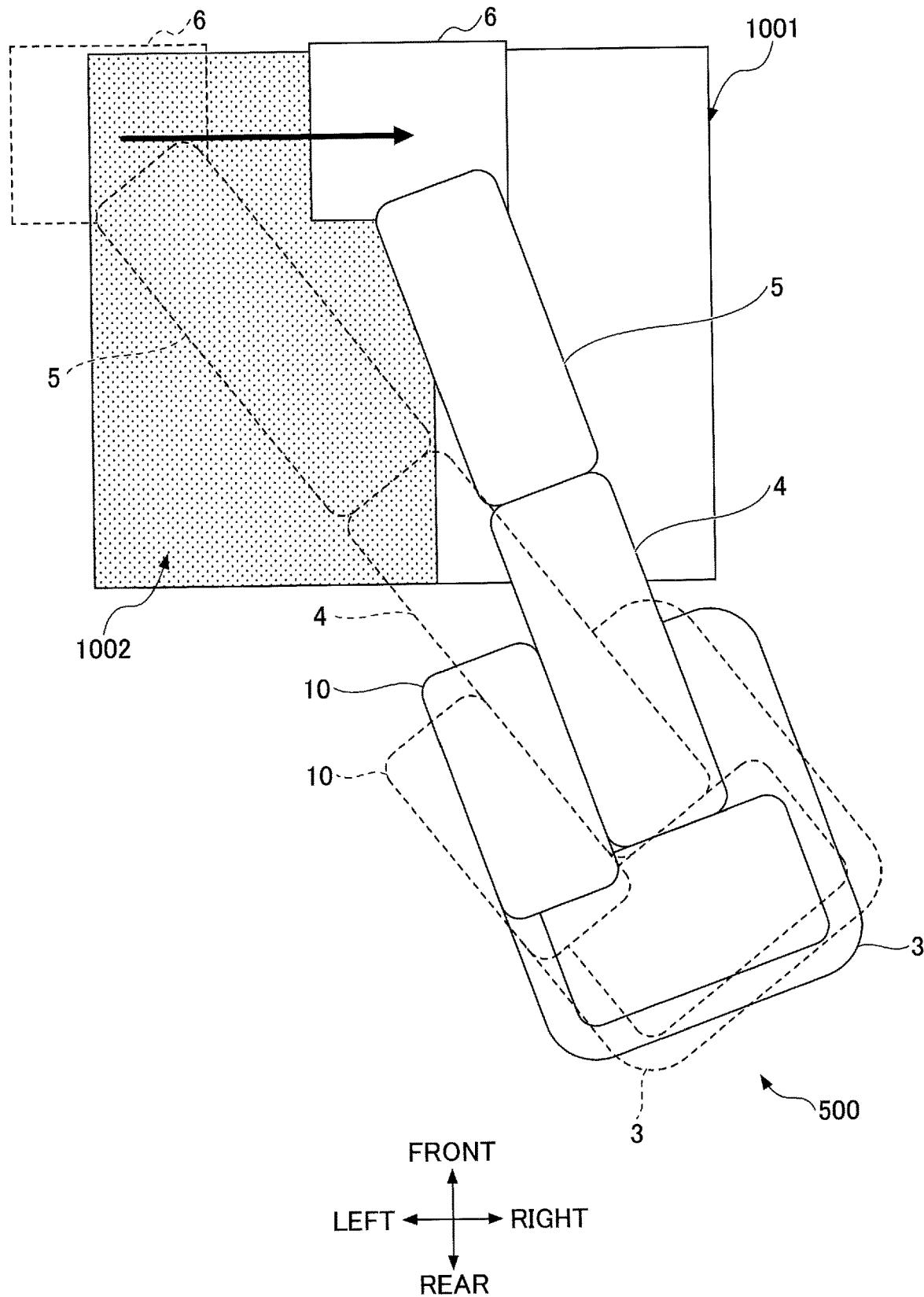
FIG. 10 is a drawing explaining a second example of the operation of the shovel in the automatic mode.

FIG. 10 is a drawing explaining the second example of an operation of the shovel 500 in the automatic mode.

As illustrated in FIG. 10, in this example, the shovel 500 performs excavation work on a construction target surface 1001 in a substantially rectangular shape in the plan view.

Herein, in this example, a part (area 1002) of the construction target surface in FIG. 10 needs to be constructed as an inclined surface inclined from the left to the right in FIG. 10 by excavation work. Therefore, it is desired to advance the excavation work in such a manner that the bucket 6 moves in a left-and-right direction of FIG. 10, which is the inclination direction of the inclined surface. Depending on environmental conditions and the like of a work site, there may be no space for arranging the shovel 500 on either right or left of the construction target surface 1001 in FIG. 10, or situations such as a problem in terms of safety may occur when the shovel 500 is arranged on either right or left. Therefore, in this example, the shovel 500 is arranged at a lower side of FIG. 10 with respect to the construction target surface 1001, and under the control of the controller 30 (teaching instruction generation unit 304), the upper turning body 3 is automatically turned so that the bucket 6 moves from the left to the right along the axis in the left-and-right direction (hereinafter referred to as "left-and-right axis") in response to an operation of the attachment by an operator.

Accordingly, the shovel 500 can achieve more appropriate construction work irrespective of the environmental conditions of construction sites.

In this case, for example, the teaching data may be set by operating the shovel 500 using a method similar to the case of FIG. 5 in a state in which the turning position of the upper turning body 3 is adjusted so that the direction of the attachment is in the left-and-right direction of the construction target surface 1001 in FIG. 10. Alternatively, as described above, the teaching data may be set by receiving corresponding data from an external apparatus and receiving an operation input from an operator and the like, without relying on an operation of the attachment and the like of the shovel 500.

It should be noted that turning automatic controls similar to the above, i.e., turning automatic controls for moving the bucket 6 along a teaching axis direction that is greatly different from the direction of the attachment in the plan view, can also be naturally applied to not only excavation work but also work other than the excavation work such as, e.g., leveling work, compaction work, and the like.

As illustrated in FIG. 10, in this example, the bucket 6 includes not only a rotation axis for rotating in a vertical direction with respect to the arm 5 but also a rotation axis for rotating in a horizontal direction, so that the bucket 6 can be adjusted in the excavation direction (left-and-right direction). Accordingly, even in a case where the difference between the direction of the attachment and the excavation direction is relatively large, the bucket 6 can rotate in the left-and-right direction by a hydraulic actuator (for example, a hydraulic motor) driven with hydraulic oil provided from the main pump 14, in a manner similar to the case of the rotation operation in the front-rear direction, and an operator and the like can appropriately adjust the direction of the bucket 6 with a predetermined operation means. Also, the direction of the bucket 6 in the plan view may be automatically adjusted in an excavation direction by, for example, causing the controller 30 to automatically adjust the direction and the flowrate of the hydraulic oil supplied to and discharged from the hydraulic actuator.

Naturally, the above construction work may be performed by a generally-available bucket 6 that does not have a rotation axis capable of rotating in the left-and-right direction.

In this example, not only the position (movement direction) of the bucket 6 in the plan view but also the position in the vertical direction may also be automatically controlled. For example, the vertical position of the bucket 6 may be automatically controlled so that, in accordance with a movement of the bucket 6 in the left-and-right direction, the teeth position of the bucket 6 moves along the target construction surface corresponding to the constructed inclined surface, or moves within a range not interfering with the target construction surface. Accordingly, in a case where, in the plan view, the direction of the attachment and the movement direction of the bucket 6 are greatly different, an operator can move the bucket 6 in such a manner that the inclined surface can be appropriately constructed. Therefore, the construction quality can be further improved. At this occasion, for example, a configuration similar to FIG. 12 explained below (a proportional valve 31 and a shuttle valve 32) is employed, and at least one of the boom 4, the arm 5, and the bucket 6 is automatically controlled, so that the controller 30 can control the vertical position of the bucket 6. When the controller 30 controls the vertical position of the bucket 6, the controller 30 can find the position of the bucket 6 on the basis of detection signals of the boom angle sensor 40, the arm angle sensor 42, and the bucket angle sensor.

[Third Example of Operation of Shovel in Automatic Mode]

Subsequently, the third example of operation of the shovel 500 in the automatic mode will be described with reference to FIG. 11.

Figure 11:
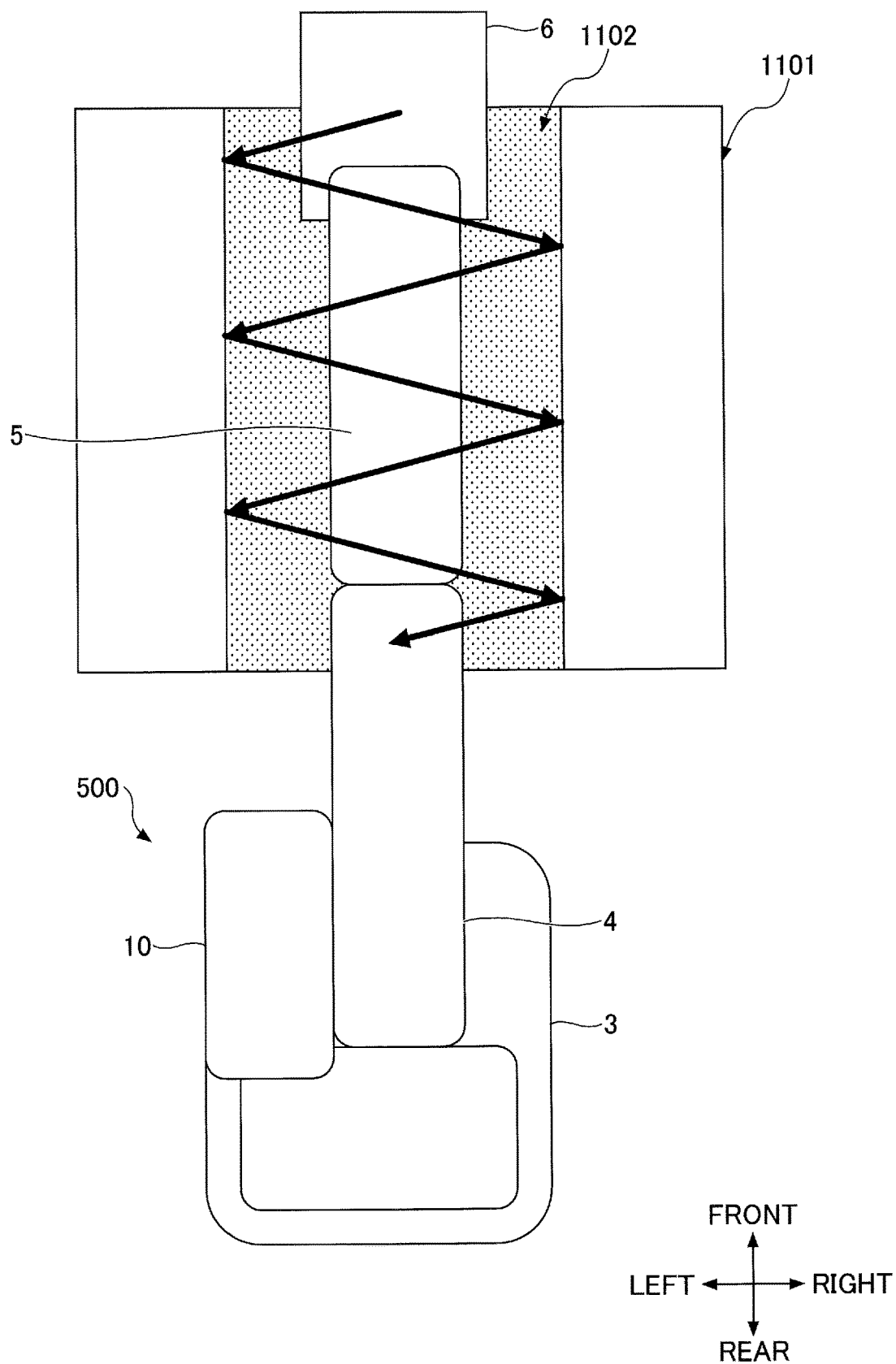
FIG. 11 is a drawing explaining a third example of the operation of the shovel in the automatic mode.

FIG. 11 is a drawing explaining the third example of operation of the shovel 500 in the automatic mode.

As illustrated in FIG. 11, in this example, in a construction target surface 1101 in a substantially rectangular shape in the plan view, the shovel 500 performs compaction work while pressing the back of the bucket 6 against the ground.

Specifically, the shovel 500 operates the attachment so that the bucket 6 is pressed against the ground while the bucket 6 is retracted toward the operator's side (toward the upper turning body 3) in response to an operator's operation. In addition, under the control of the controller 30 (the teaching instruction generation unit 304), in accordance with an operation of the attachment in the direction toward the operator, the shovel 500 automatically repeats reciprocal motion of the upper turning body 3 in the left-and-right direction to compact an area 1102 in the construction target surface 1101 having a certain width wider than the width of the bucket 6. In other words, in accordance with a movement of the attachment toward the operator's side in response to an operator's operation, the controller 30 controls the turning operation of the upper turning body 3 so that the bucket 6 automatically repeats reciprocal motion in the left-and-right direction. Accordingly, an area having a width wider than the width of the bucket 6 can be efficiently compacted.

In this case, the teaching data may include, for example, data corresponding to the width of the area 1102 and data corresponding to a movement speed in the left-and-right direction, and the like. The teaching data may be data corresponding to a movement trace of the bucket 6 in the plan view (for example, trace data corresponding to thick arrows in a zigzag shape in FIG. 11). As described above, for example, the teaching data may be set by receiving corresponding data from an external apparatus and receiving an operation input from an operator and the like, without relying on an operation of the attachment and the like of the shovel 500. In the latter case, for example, the teaching data may be set by recording the trace of the movement of the bucket 6 in response to an operator's operation.

Turning automatic controls similar to the above may also be applied to work other than compaction work. For example, the leveling work of the shovel 500 may be performed by sweeping away small protrusions on the ground to the right and left by repeating reciprocal motion of the upper turning body 3 in the left-and-right direction in accordance with a movement of the attachment in the front-rear direction. In this case, the movement direction of the attachment may be in a direction in which the bucket 6 moves away from the upper turning body 3, i.e., in a direction from the operator's side toward the front of the upper turning body 3, instead of in a direction in which the bucket 6 approaches the upper turning body 3, i.e., in a direction from the front of the upper turning body 3 toward the operator's side (toward the upper turning body 3).

[Fourth Example of Operation of Shovel in Automatic Mode]

Figure 12:
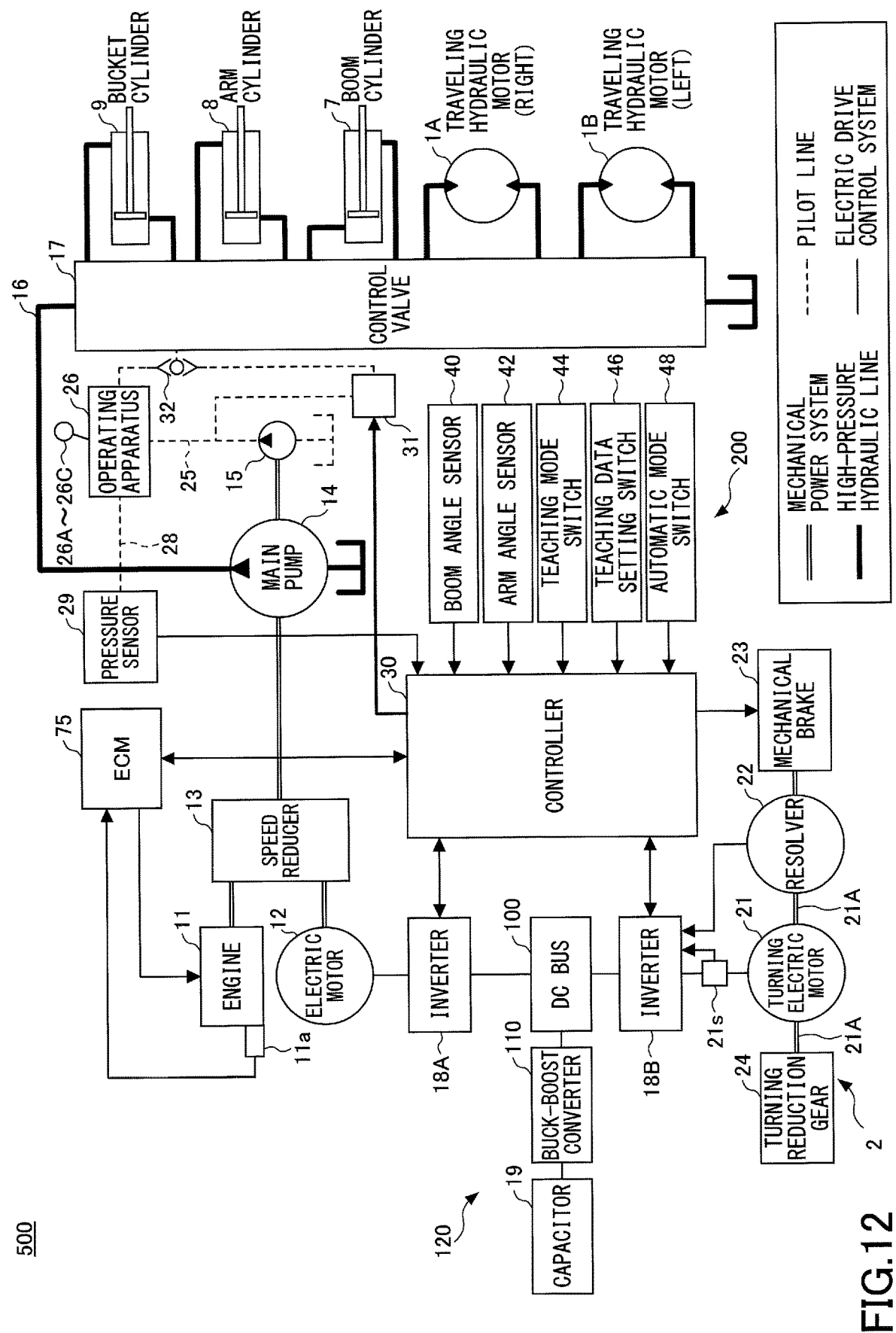
FIG. 12 is a block diagram illustrating another example of the configuration of the shovel.
Figure 13A:
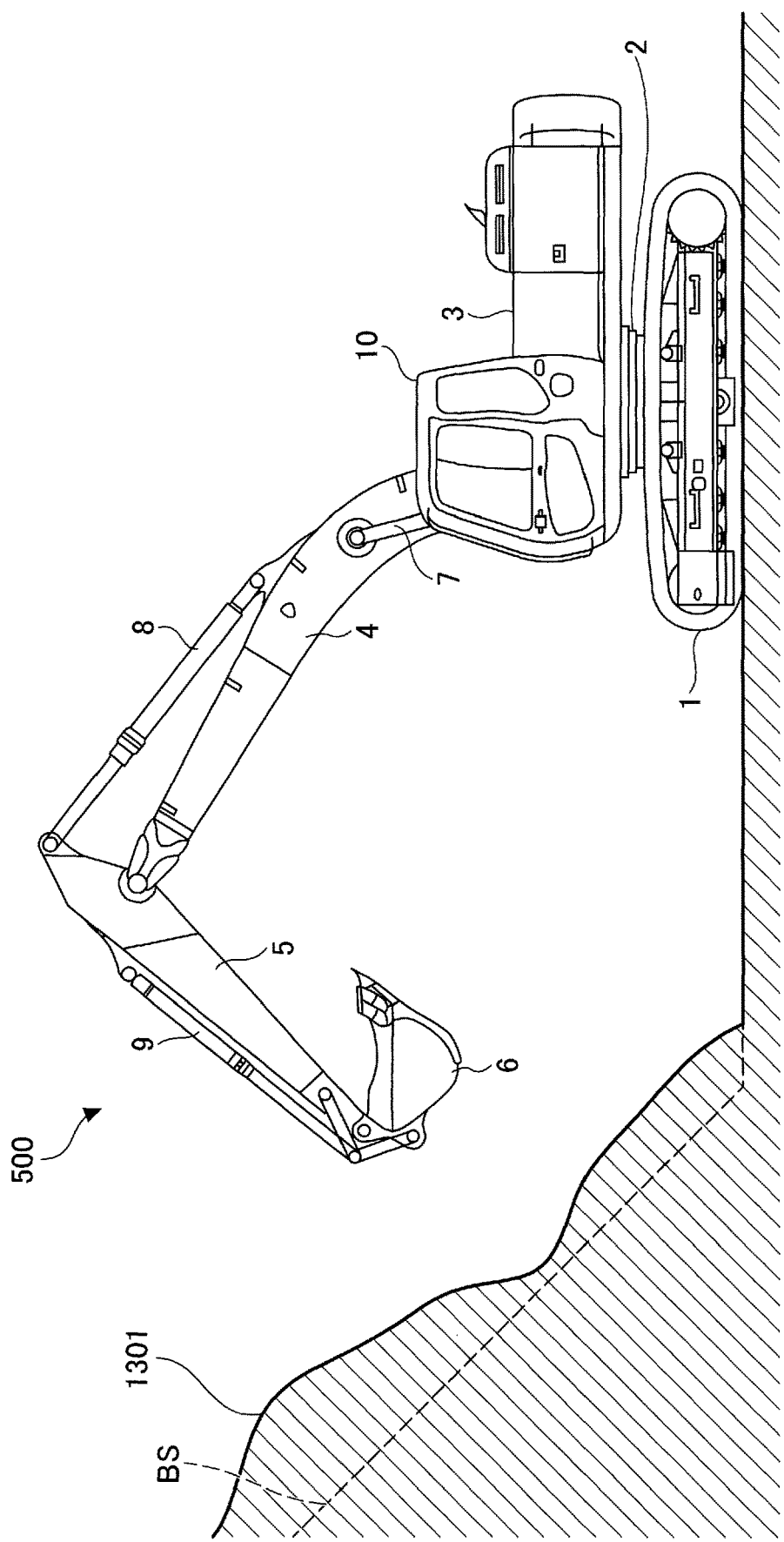
FIG. 13A is a drawing explaining a fourth example of the operation of the shovel in the automatic mode.
Figure 13B:
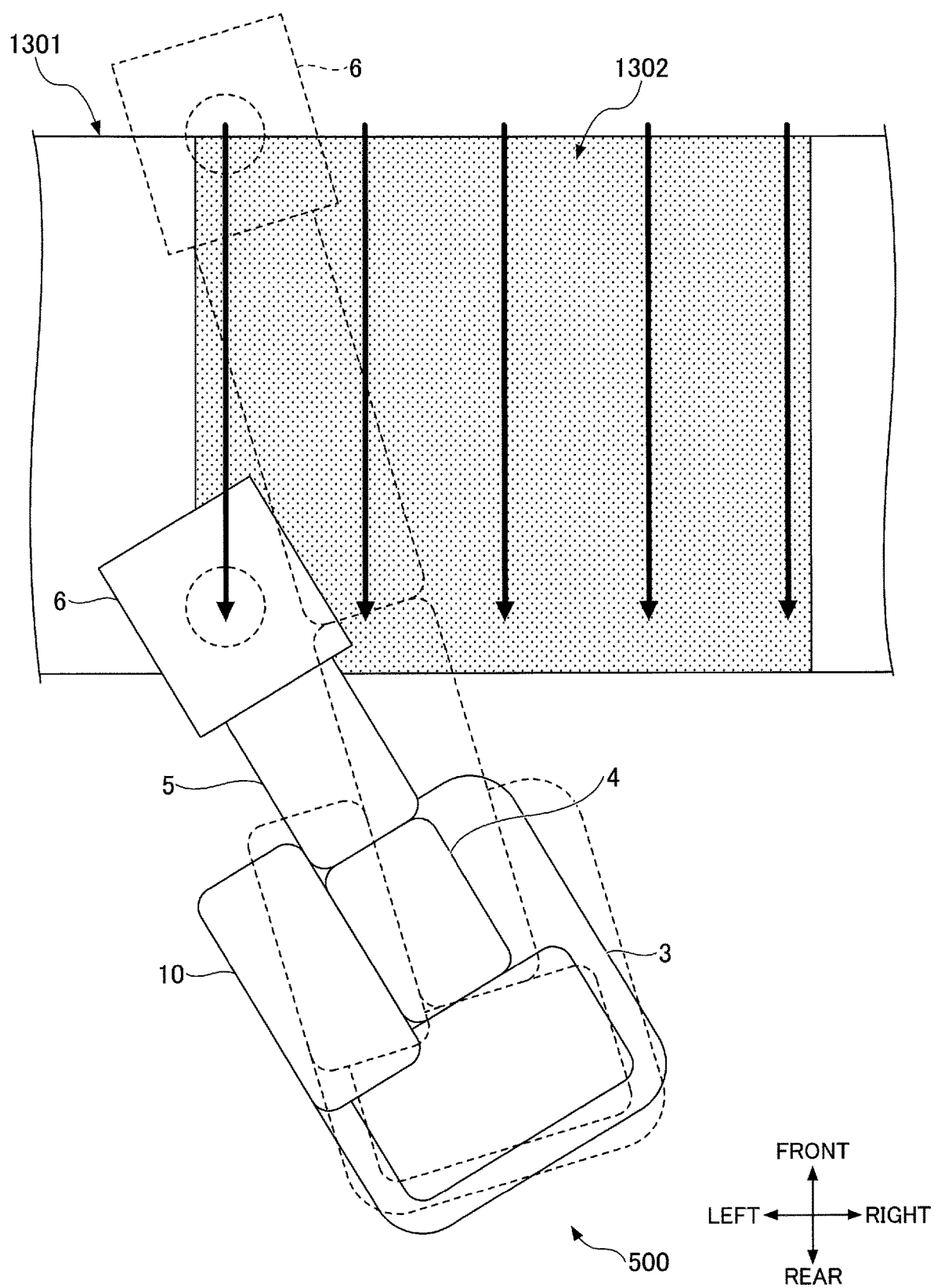
FIG. 13B is a drawing explaining the fourth example of the operation of the shovel in the automatic mode.

Subsequently, a fourth example of operation of the shovel 500 in the automatic mode will be explained with reference to FIG. 12, FIG. 13 (FIG. 13A, FIG. 13B).

<Basic Configuration of Shovel>

First, a basic configuration of the shovel 500, which is the premise of the operation of the shovel 500 according to this example, will be described with reference to FIG. 12.

FIG. 12 is a block diagram illustrating another example of a configuration of the shovel 500. Hereinafter, differences from the example in FIG. 2 will be mainly explained.

An operation system of the shovel 500 according to this example includes a pilot pump 15, an operating apparatus 26, a pressure sensor 29, and a shuttle valve 32. The control system of the shovel 500 according to this example includes a controller 30, an ECM 75, an engine speed sensor 11a, an inverter 18A, an inverter 18B, a current sensor 21s, a resolver 22, a boom angle sensor 40, an arm angle sensor 42, a teaching mode switch 44, a teaching data setting switch 46, an automatic mode switch 48, and a proportional valve 31.

The operating apparatus 26 is connected to the control valve 17 via a later-described shuttle valve 32 provided in a secondary-side pilot line. Accordingly, the control valve 17 may receive a pilot pressure according to the state of operation of each of the lower traveling body 1, the upper turning body 3, the boom 4, the arm 5, and the bucket 6, and the like in the operating apparatus 26. Therefore, the control valve 17 can drive the hydraulic actuators in accordance with the state of operation in the operating apparatus 26.

The proportional valve 31 is provided in a pilot line connecting the pilot pump 15 and the shuttle valve 32, and configured to be able to change the size of area of flow (i.e., the size of a cross-sectional area in which hydraulic oil can flow). The proportional valve 31 operates in accordance with a control instruction received from the controller 30. Accordingly, even in a case where an operator is not operating the operating apparatus 26, the controller 30 can provide hydraulic oil discharged from the pilot pump 15 via the proportional valve 31 and the shuttle valve 32 to a pilot port in a corresponding control valve in the control valve 17.

The shuttle valve 32 has two inlet ports and one outlet port, and outputs one of hydraulic oils input to the two inlet ports, whichever has a higher pilot pressure, to the outlet port. The shuttle valve 32 has one of the two inlet ports connected to the operating apparatus 26 and the other of the two inlet ports connected to the proportional valve 31. The outlet port of the shuttle valve 32 is connected via the pilot line to a pilot port in a corresponding control valve in the control valve 17. Therefore, the shuttle valve 32 can apply the pilot pressure generated by the operating apparatus 26 and the pilot pressure generated by the proportional valve 31, whichever is higher, to the pilot port of the corresponding control valve. Specifically, by causing the proportional valve 31 to output a pilot pressure higher than the secondary side pilot pressure that is output from the operating apparatus 26, the controller 30 can control the corresponding control valve, and automatically control an operation of the lower traveling body 1 and the attachment AT, without relying on an operation performed with the operating apparatus 26 by an operator.

<Details of Operation of Shovel in Automatic Mode>

Subsequently, more specifically, the fourth example of operation of the shovel 500 in the automatic mode, more specifically, the turning automatic control of the upper turning body 3 corresponding to this operation, will explained with reference to FIG. 13A, FIG. 13B.

FIG. 13A, FIG. 13B are drawings for explaining the fourth example of operation of the shovel 500 in the automatic mode. Specifically, FIG. 13A is a side view of an inclined land 1301, which is a construction target to be constructed by the shovel 500, and a slope BS, which is a target construction surface. FIG. 13B is a drawing illustrating a specific example of operation in which the shovel 500 constructs the slope BS.

As illustrated in FIG. 13A, FIG. 13B, in this example, the shovel 500 automatically operates the attachment and the upper turning body 3 to perform earth cutting work and compaction work so that the bucket 6 forms the slope BS in a previously-set work range 1302 of the inclined land 1301.

Specifically, for example, the shovel 500 is arranged at a position facing the work range 1302, and in this state, the work range 1302 is set. Then, the controller 30 (the teaching instruction generation unit 304) automatically controls the attachment (the boom 4, the arm 5, and the bucket 6) and the upper turning body 3, so that, for each of multiple lanes (for example, five thick arrows in FIG. 13B) defined in the inclination direction in the work range 1302, the bucket 6 moves from the farther side toward the operator's side (the upper turning body 3) along the teaching axis set in the inclination direction, and a teeth end (during earth cutting) or a rear surface (during compaction) of the bucket 6 moves along the slope BS. Specifically, the controller 30 automatically controls the operation of the attachment and the upper turning body 3 while finding the positions of the teeth end and the rear surface of the bucket 6 on the basis of detection signals provided by the boom angle sensor 40, the arm angle sensor 42, and the bucket angle sensor. Accordingly, with just the work range 1302 being set, the shovel 500 can be caused to automatically perform the construction work of the slope BS in the work range 1302. At this time, for example, the work range 1302 may be set by receiving an operation input from an operator and the like, and for example, the work range 1302 may be set by receiving data corresponding to the work range 1302 from a predetermined external apparatus via a communication apparatus. For example, a lane in which the bucket 6 moves along the teaching axis in the plan view may be set in advance together with the configuration of the work range 1302, or the controller 30 may automatically derive the lane in accordance with the width of the work range 1302 in the left-and-right direction as seen from the upper turning body 3.

For example, on the basis of a recognition result by a spatial recognition apparatus capable of recognizing a space in front of the upper turning body 3 mounted on the shovel 500, the controller 30 recognizes a construction situation of the slope BS, and continues the construction work of the slope BS until the construction of the slope BS is completed with a predetermined quality. Accordingly, with just the work range 1302 being set, the shovel 500 can be caused to automatically perform the construction work of the slope BS in the work range 1302 until a predetermined quality is reached, i.e., until the construction is finished. At this time, examples of spatial recognition apparatuses include a monocular camera, a LIDAR (Light Detecting and Ranging), a millimeter wave radar, a stereo camera, a distance image camera, an ultrasonic sensor, an infrared sensor, and the like.

It should be noted that full automatic controls similar to the above can naturally be applied not only to the construction work of the slope, but also to any work such as excavation work and leveling work (see for example, FIG. 4).

[Effects]

As described above, according to this embodiment, the controller 30 (the teaching instruction generation unit 304) controls the turning operation of the upper turning body 3 so that the bucket 6 performs a predetermined operation in the plan view.

Therefore, during work with the attachment, the controller 30 can perform a predetermined operation in which the position of the bucket 6 is caused to move not only in the front-rear direction but also in the left-and-right direction as seen from the upper turning body 3. Therefore, the width of the work of the shovel 500 can be expanded, and the work efficiency of the shovel 500 can be improved.

In this embodiment, although the bucket 6 is used as an end attachment, an end attachment other than the bucket 6 may be adopted.

In this embodiment, the controller 30 (the teaching instruction generation unit 304) may control the turning operation of the upper turning body 3 in response to an operation of the attachment, so that the bucket 6 performs a predetermined operation (hereinafter referred to as an "instructed operation" for convenience) in the plan view in response to an operator's operation, i.e., an operation of the attachment including the boom 4 and the arm 5 performed by an operator.

Accordingly, the controller 30 can perform a predetermined instructed operation in a specific manner by causing the upper turning body 3 to operate in accordance with an operation of the attachment in response to an operator's operation.

In this embodiment, in a case where a predetermined work range (for example, the work range 1302) is set, the controller 30 (the teaching instruction generation unit 304) may automatically control the operation of the attachment and the upper turning body 3 so that the bucket 6 performs a predetermined processing (for example, forming of the slope BS) in the work range.

Therefore, with only a work range being set in advance for the shovel 500, the shovel 500 can be caused to perform a predetermined processing on the work range automatically and efficiently.

In this embodiment, the controller 30 (the teaching instruction generation unit 304) may control the turning operation of the upper turning body 3, so that the bucket 6 repeats movement in the left-and-right direction in the plan view in accordance with a movement of the attachment in the front-rear direction in response to an operator's operation.

Therefore, in accordance with an operation of the attachment, the shovel 500 can perform construction work on a range wider than the width of the bucket 6 as a target, and therefore, the work efficiency can be further improved.

In this embodiment, in a case where the construction target is a slope, the controller 30 (the teaching instruction generation unit 304) may control the turning operation of the upper turning body 3 so that the bucket 6 performs a predetermined instructed operation in the plan view.

Therefore, the work efficiency of the shovel 500 where the construction target is a slope can be improved.

In this embodiment, the controller 30 (the teaching instruction generation unit 304) may control the turning operation of the upper turning body 3, so that the bucket 6 moves along the predetermined axis (teaching axis) in the plan view in response to an operator's operation, i.e., an operation of the attachment including the boom 4 and the arm 5 by an operator.

Therefore, an operator can move the bucket 6 along the teaching axis by just operating the attachment such as the boom 4 and the arm 5 with the levers 26A and 26B. In particular, even in a case where the movement direction of the bucket 6 in the plan view as seen from the shovel 500 does not match a direction along a predetermined axis, i.e., a construction direction, an operator can move the bucket 6 along the predetermined construction direction by just operating the levers 26A and 26B corresponding to the attachment. Therefore, for example, in a case where linear excavation work, leveling work, or the like is repeatedly performed along a predetermined axis in a relatively large construction surface, the linear construction can be performed with only an operation of the attachment without relying on the arrangement of the shovel 500 as seen in the plan view, and accordingly, the workability of an operator can be improved, and the work efficiency of construction work can be improved. As compared with repeating linear construction while moving the shovel 500 by traveling by driving the lower traveling body 1, it is not necessary to travel by driving the lower traveling body 1, and the energy efficiency of the shovel 500, i.e., the fuel consumption rate, can be improved. In addition, an operator can concentrate on an operation of an attachment such as the boom 4 and the arm 5, i.e., an operation of the attachment in the height direction, and therefore, the accuracy of construction work can be improved. In addition, since linear construction work is repeated along a predetermined axis, the construction surface can be finished more neatly, and the construction quality can be improved.

In this embodiment, the bucket position information acquiring unit 302 acquires bucket position information about the position of the bucket 6 with reference to the lower traveling body 1. Then, on the basis of the bucket position information acquired by the bucket position information acquiring unit 302, the teaching instruction generation unit 304 may control the turning operation of the upper turning body 3 so that the bucket 6 moves along a predetermined axis (teaching axis) in the plan view.

Accordingly, while monitoring a change in the bucket position information, the teaching instruction generation unit 304 can control the turning operation of the upper turning body 3 so that the bucket 6 moves along the teaching axis in the plan view.

In this embodiment, the boom angle sensor 40 detects the angle of the boom 4 with respect to the upper turning body 3, and the arm angle sensor 42 detects the angle of the arm 5 with respect to the boom 4. Then, the bucket position information acquiring unit 302 may acquire bucket position information on the basis of detection results of the boom angle sensor 40 and the arm angle sensor 42.

Therefore, the bucket position information acquiring unit 302 can obtain relative bucket position information with respect to the lower traveling body 1 on the basis of the link length of the boom 4 and the arm 5, the boom angle, and the arm angle, which are known.

It should be noted that, for example, the lower traveling body 1 or the upper turning body 3 may be equipped with a distance sensor such as a millimeter wave radar or a LIDAR or another sensor including an image sensor (camera), and the bucket position information may be acquired from a detection result of the another sensor.

In this embodiment, the bucket position information acquiring unit 302 may acquire, as the bucket position information, a measured value of a distance from the turning center axis of the upper turning body 3 to the bucket 6 and a measured value of the turning angle of the upper turning body 3 with respect to the lower traveling body 1.

Accordingly, more specifically, the bucket position information acquiring unit 302 can acquire, as the bucket position information, a radial coordinate (a distance from the turning center axis) and an angular coordinate (a turning angle) in a plane polar coordinate system in which the origin is on the turning center axis of the upper turning body 3 with respect to the lower traveling body 1 as seen in the plan view.

In this embodiment, on the basis of measured values of a distance from the turning center axis and a turning angle acquired by the bucket position information acquiring unit 302, the teaching instruction generation unit 304 may calculate the target value of the turning angle so that the bucket 6 moves along a predetermined axis (teaching axis) in the plan view, and may control the turning operation of the upper turning body 3 so that the turning angle of the upper turning body 3 attains the calculated target value.

Therefore, more specifically, the teaching instruction generation unit 304 can calculate a target value of the turning angle (target turning angle), and perform position control of the upper turning body 3 so that the bucket 6 moves in the teaching axis in the plan view.

In this embodiment, an automatic mode switch 48 is provided to cause the operation mode of the shovel 500 to transit to "automatic mode" in which the upper turning body 3 is automatically turned by the teaching instruction generation unit 304. Then, in a case where the "automatic mode" is set on the basis of an operation input performed with the automatic mode switch 48, the teaching instruction generation unit 304 may control the turning operation of the upper turning body 3 so that the bucket 6 moves along a predetermined axis (teaching axis) in the plan view in accordance with an operation of the attachment including the boom 4 and the arm 5 performed by an operator.

Therefore, an operator can set and cancel the automatic mode in accordance with an operator's operation with the automatic mode switch 48. Therefore, in a case where linear construction work is repeatedly performed along a predetermined axis, and an operator proceeds to subsequent construction work, the operator operates the automatic mode switch 48 to cancel the automatic mode, so that the operator can manually operate the upper turning body 3 to move the bucket 6 to a start position of subsequent construction work.

In this embodiment, the teaching mode switch 44 is provided to cause the operation mode of the shovel 500 to transit to the "teaching mode" in which a predetermined axis (teaching axis) can be set. Furthermore, in a case where the "teaching mode" is set on the basis of an operation input to the teaching mode switch 44, the teaching data setting unit 303 may set a predetermined axis (teaching axis) in accordance with an operation of the attachment including the boom 4 and the arm 5 performed by an operator.

Therefore, with an operator's operation, the operator can set the teaching axis.

In this embodiment, in a case where the "teaching mode" is set on the basis of an operation input performed with the teaching mode switch 44, the teaching data setting unit 303 acquires position information about a first position (first end point) of the bucket 6 and position information about a second position (second end point) of the bucket 6 different from the first position, in accordance with an operation of the boom 4 and the arm 5 performed by an operator. Then, the teaching data setting unit 303 sets a predetermined axis (teaching axis) on the basis of the position information about the first position and the second position.

Therefore, for example, the teaching data setting unit 303 can acquire position information about two different positions between which the bucket 6 is moved when an operator operates the attachment including the boom 4 and the arm 5, and a teaching axis can be set as a line segment or a vector connecting the two points.

In this embodiment, an inclination sensor is provided to detect an inclination of a work surface where the shovel 500 is located. Then, on the basis of the inclination sensor, the teaching instruction generation unit 304 may control the turning operation of the upper turning body 3 so that the bucket 6 moves along a predetermined axis (teaching axis) in the plan view.

Therefore, even though, due to the inclination of the work surface, an operation speed and the like of an attachment such as the boom 4 and the arm 5 in response to an operator's operation may change, the teaching instruction generation unit 304 can control the turning operation of the upper turning body 3 in view of the measured value of the inclination of the work surface. Therefore, the teaching instruction generation unit 304 can control the turning operation of the upper turning body 3 so that the bucket 6 appropriately moves along a predetermined axis (teaching axis) in the plan view, irrespective of the inclination of the work surface of the shovel 500.

In this embodiment, with the turning electric motor 21 for driving the upper turning body 3 being further provided, the teaching instruction generation unit 304 may control the turning operation of the upper turning body 3 by controlling the turning electric motor 21.

Therefore, with an electronic position control of the turning electric motor 21, the turning automatic control of the upper turning body 3 can be achieved relatively easily. Since the turning electric motor 21 has a relatively high responsiveness to the drive instruction, the followability to the teaching axis in the plan view of the bucket 6 can be improved.

In this embodiment, instead of the turning electric motor 21, a turning hydraulic motor hydraulically driving the upper turning body 3 may be employed. In this case, the control valve 17 is additionally provided with a direction control valve (hereinafter referred to as "turning direction control valve") for supplying hydraulic oil from the main pump 14 to the turning hydraulic motor. The normal instruction generation unit 301 and the teaching instruction generation unit 304 generates, as a normal instruction and a teaching instruction, respectively, control instructions for driving the turning hydraulic motor, i.e., control instructions for controlling the turning direction control valve. Then, in a manner similar to the embodiment explained above, the control instruction output determination unit 305 may output any one of the normal instruction and the teaching instruction to a turning direction control valve (in the case of electric drive) or a pressure reducing valve for controlling the pilot pressure of the turning direction control valve (in the case of pilot pressure drive).

According to the above-described embodiment, a shovel that can further improve work efficiency during construction with an attachment can be provided.

As described above, the embodiment for carrying out the present invention has been described in detail, but the present invention is not limited to such a specific embodiment, and the present invention can be variously modified and changed within the range of the gist of the present invention described in the claims.

What is claimed is:

1. A shovel comprising:
    a traveling body;
    a turning body mounted on the traveling body;
    a work attachment including a boom attached to the turning body, an arm attached to an end of the boom, and an end attachment attached to an end of the arm; and
    a processor configured to control turning of the turning body in accordance with a movement of the work attachment as an operator operates the work attachment, to cause the end attachment to make a predetermined movement as seen in a plan view.

2. The shovel according to claim 1, wherein the processor is further configured to, in a case where a work range is set, automatically control the movement of the work attachment and a movement of the turning body to cause the end attachment to perform predetermined processing to the work range.

3. The shovel according to claim 1, wherein the processor is further configured to control the turning of the turning body to cause the end attachment to move along a predetermined axis as seen in the plan view as the operator operates the work attachment.

4. The shovel according to claim 3, wherein the processor is further configured to acquire position information about the end attachment with reference to the traveling body, and to control the turning of the turning body, based on the acquired position information, to cause the end attachment to move along the predetermined axis as seen in the plan view.

5. The shovel according to claim 4, further comprising:
a boom angle sensor configured to detect an operation angle of the boom with respect to the turning body; and
an arm angle sensor configured to detect an operation angle of the arm relative to the boom,
wherein the processor is further configured to acquire the position information, based on detection results of the boom angle sensor and the arm angle sensor.

6. The shovel according to claim 4, wherein the processor is further configured to acquire, as the position information, a measured value of a distance from a turning center axis of the turning body to the end attachment and a measured value of a turning angle of the turning body with respect to the traveling body.

7. The shovel according to claim 6, wherein the processor is further configured to calculate, based on the acquired measured value of the distance from the turning center axis and the acquired measured value of the turning angle, a target value of the turning angle to cause the end attachment to move along the predetermined axis as seen in the plan view, and control the turning of the turning body to cause the turning angle of the turning body to be the target value.

8. The shovel according to claim 3, further comprising:
an automatic mode switch configured to receive an input for changing an operation mode of the shovel to an automatic mode in which the processor automatically turns the turning body,
wherein the processor is further configured to, in a case where the automatic mode is set based on an operation input to the automatic mode switch, control the turning of the turning body to cause the end attachment to move along the predetermined axis as seen in the plan view as the operator operates the work attachment.

9. The shovel according to claim 3, further comprising:
a teaching mode switch configured to receive an input for changing an operation mode of the shovel to a teaching mode in which the predetermined axis is settable; and
the processor is further configured to, in a case where the teaching mode is set based on an operation input to the teaching mode switch, set the predetermined axis as the operator operates the work attachment.

10. The shovel according to claim 9, wherein the processor is further configured to, in a case where the teaching mode is set based on the operation input to the teaching mode switch, acquire position information about a first position of the end attachment and position information about a second position of the end attachment different from the first position as the operator operates the work attachment, and set the predetermined axis, based on the position information about the first position and the second position.

11. The shovel according to claim 3, further comprising:
an inclination sensor configured to detect an inclination of a work surface where the shovel is located,
wherein the processor is further configured to control, based on a detection result of the inclination sensor, the turning of the turning body to cause the end attachment to move along the predetermined axis in the plan view.

12. The shovel according to claim 1, wherein the processor is further configured, to, according as the work attachment moves in a front-rear direction as the operator operates the work attachment, control the turning of the turning body to cause the end attachment to repeat a reciprocal motion to right and left as seen in the plan view.

13. The shovel according to claim 1, wherein the processor is further configured to, in a case where a construction target is a slope, control the turning of the turning body to cause the end attachment to make the predetermined movement as seen in the plan view.

14. The shovel according to claim 1, further comprising:
an electric motor configured to drive the turning body,
wherein the processor is further configured to control the turning of the turning body by controlling the electric motor.

15. The shovel according to claim 1, wherein the processor is further configured to control the turning of the turning body in accordance with the movement of the work attachment as the operator operates the work attachment, to cause the end attachment to move from a predetermined start point position of work toward the shovel.

16. The shovel according to claim 1, wherein the processor is further configured to calculate a target value of a turning angle of the turning body based on a change in a position of the end attachment and a change in the turning angle as the operator operates the work attachment and to control the turning of the turning body based on the calculated target value.

17. The shovel according to claim 1, further comprising:
a switch configured to choose between a first control mode to enable automatic control to automatically control the turning of the turning body in accordance with the movement of the work attachment as the operator operates the work attachment and a second control mode to disable the automatic control, in accordance with an operation input to the switch by the operator,
wherein the processor is configured to automatically control the turning of the turning body in accordance with the movement of the work attachment as the operator operates the work attachment, to cause the end attachment to make the predetermined movement as seen in the plan view when the first control mode is chosen by the operator through the switch.

* * * * *